(12) United States Patent
Igarashi

(10) Patent No.: US 6,203,968 B1
(45) Date of Patent: Mar. 20, 2001

(54) METHOD FOR MANUFACTURING AN OPTICAL DISK MASTER USING AN EXPOSURE BEAM, ITS EXPOSURE APPARATUS AND AN OPTICAL DISK

(75) Inventor: Kenji Igarashi, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/043,126

(22) PCT Filed: Sep. 19, 1996

(86) PCT No.: PCT/JP96/02694

§ 371 Date: Mar. 19, 1998

§ 102(e) Date: Mar. 19, 1998

(87) PCT Pub. No.: WO97/11459

PCT Pub. Date: Mar. 27, 1997

(30) Foreign Application Priority Data

Sep. 19, 1995 (JP) .................................................. 7-240269

(51) Int. Cl.$^7$ ...................................................... G03C 5/00
(52) U.S. Cl. .......................... 430/320; 430/321; 369/111; 369/112
(58) Field of Search .................................. 428/64.1, 64.2, 428/64.4, 913; 369/44.26, 54, 58, 275.1, 275.3, 111, 121; 430/320, 321

(56) References Cited

U.S. PATENT DOCUMENTS

| 5,045,438 | 9/1991 | Adachi . |
| 5,756,265 | * 5/1998 | Abe ....................................... 430/321 |
| 5,896,361 | * 4/1999 | Jung ....................................... 369/112 |

FOREIGN PATENT DOCUMENTS

| 0 427 302 | 5/1991 | (EP) . |
| 7-65385 | 3/1995 | (JP) . |
| WO 93/13524 | 7/1993 | (WO) . |

OTHER PUBLICATIONS

Development of a Precise Optical Disk Mastering Machine, Fumio Hara, Masaru Itoo, et al Central Research Laboratory, Hitachi, Ltd. Kokubunji, Tokyo, Japan, 185.

Journal of Japan Society for Precision Engineering vol. 50, No. 12 (1984) p. 25–29) Tsuboi et al Sony.

* cited by examiner

*Primary Examiner*—Elizabeth Evans
(74) *Attorney, Agent, or Firm*—Oblon, Spivak, McClelland, Maier & Neustadt, P.C.

(57) ABSTRACT

When a laser beam is directed onto an optical head substrate (3) to allow it to form a spiral or concentric pit strings (P), the laser beam is so shot as to provide a path parallel to, or obliquely with respect to, the pit string (P). For example, the laser beam shot provides a circular arc path having a diameter corresponding to a sum of a radius r of the innermost side pit string {P(point B)} and a radius R of the outermost side pit string {P(point A)} on the optical disk substrate, the circular arc path contacting with the innermost side pit string and with the outermost side pit string on the optical disk substrate.

20 Claims, 20 Drawing Sheets

METHOD FOR MANUFACTURING AN OPTICAL DISK MASTER USING AN EXPOSURE BEAM, ITS EXPOSURE APPARATUS AND AN OPTICAL DISK

TECHNICAL FIELD

The present invention relates to a method for manufacturing an optical disk master by exposing an optical disk substrate with a beam, such as a laser beam or EB (electron beam) and, by doing so, forming a spiral or concentric pit strings, its associated exposure apparatus and an optical disk manufactured from the optical disk master.

BACKGROUND ART

In the manufacture of an optical disk, first a photoresist is coated, as a photosensitive material, on a glass substrate and a resultant substrate is used as an optical disk substrate.

Then the photoresist of the substrate is exposed with a beam, such as laser beam or EB, and information to be recorded is formed, as recesses, in the optical disk substrate and recorded as pit signals (pit string) in the optical disk substrate.

The resultant optical disk substrate is subjected to develop-processing. The information is copied from the optical disk master to provide a metal substrate stamper necessary to copy optical disks.

The copying is performed with the use of a metal substrate stamper to provide an optical disk as a finished product. In the manufacture of the optical disk, information recording is effected by exposing the photoresist on the optical disk substrate with the laser beam.

FIG. 24 is a schematic view showing a recording apparatus for such an optical disk substrate. An optical disk substrate 3 is placed on a stage 2 coupled to a spindle motor 1. The optical disk 3 is comprised of a glass substrate with a photoresist coated as a photosensitive material.

A one-axial slider 4 is arranged above the stage 2 and, at its moving end, an exposure beam optical head is provided as the exposure beam laser head 5. The optical head 5 allows a laser beam which is output from a beam exposure optical system 6 to be directed onto the optical disk substrate.

The one-axial slider 4 adopts a linear guide drive system, that is, allows the moving end with the optical head 5 mounted thereat to freely move in a radius direction of the optical disc substrate 3.

A computer 7 controls the rotation of a spindle motor 1 and the movement of the one-axial slider 4 and controls the outputting of a laser beam of a beam exposure optical system 6.

In the arrangement as set out above, the optical disk substrate 3 is rotated by the rotation of the spindle motor 1 and, in this state, the optical head 5 is slidably moved by the one-axis slider 4 in a one-axis direction, that is, in the radius direction of the optical disk substrate 3.

The recording of the exposure beam optical head 5 is carried out through its linear slide movement (a linear guide system) from a position of the outermost circumference radius R to that of the innermost circumference radius r on the optical disk substrate as shown in FIG. 25. At this time, the row of digital signals to be recorded is set orthogonal to the slide movement direction.

By doing so, a laser beam exiting from the optical head 5 is directed to a rotating resist-coated optical disk substrate 3. When, at this time, the directing of the laser beam is controlled in accordance with information, groups of information such as pits and grooves are recorded on the optical disk substrate 3.

At this time, the position of the optical head 5 is measured by a laser interferometer 4a and feedback-controlled at all times by a fine adjustment system, not shown. Thus, the resolution of the track pitch by such an exposure apparatus will be unconditionally determined by the resolution measured by the laser interferometer.

Further, at the linear scan drive system of the optical head 5, it is necessary to make the one-axis slider 4, etc., high in rigidity. For this reason, as the one-axis slider 4 use is made of, for example, a slider of a two-guide system.

Such a slider is of such a type as to be set astride the optical disk substrate and a resultant apparatus as a whole will become larger in weight and bulkier.

As a drive system of the exposure beam optical head 5, there are two types, one using a direct scan linear guide system and the other using a swing arm system as seen in the magnetic recording system of an HDD (hard disk drive).

The drive by the swing arm system is done, by moving the optical head 5 as shown in FIG. 25, in circular arc motion from the position of the outermost circumference recording radius R to that of the inner-most circumference recording radius r.

In such a system, the rotation center of the swing arm is located outside the optical disk substrate 3, so that the drive path of the optical head 5 has a given curvature and is nearly approximate to that of the linear guide system.

The position of the beam exposure head of the swing arm system is grasped by an encoder provided at a rotation shaft for driving the rotation center of the drive path. In consequence, the resolution of the track pitch in the swing arm system has also its limit decided by the resolution of the encoder.

In a case where a larger amount of information than the present state is recorded on an optical disk, it is necessary to shorten the distance between adjacent pit strings (track pitch). Accordingly the distance between the adjacent pit strings becomes shorter than a length of a single pit.

In order to effect high density recording, it is required that high accurate positioning be made with respect to a radial direction at a time of forming pits one by one.

In the current exposure apparatus, a motion error when the exposure optical head is moved emerges directly as an uneven track pitch and it is necessary to reduce such motion error to a minimum possible extent.

In order to satisfy this requirement, one method is by raising the resolution of a position detector for use in the exposure apparatus. In recent not steady advance of the encoder and laser interferometer and their high-cost tendency, in terms of their position resolution, there is a strong demand for a high-resolution exposure apparatus not depending upon the resolution of such position detectors.

In the respective drive systems, the position of the exposure optical head 5 or a table (slider) with an optical head incorporated thereon is controlled with the use of a linear encoder or laser interference range finder. A target to be inherently position-controlled is a condensed laser beam spot by which a resist is actually sensitized/recorded. However, the position of such a condensed beam spot is not directly observed and measured.

In the driving method using the conventional linear guide system or swing-arm system, a feed error is generated depending upon the resolution of the position detector used and a consequent uneven track pitch is produced, thus making it difficult to record information at a high density.

It is accordingly an object of the present invention to provide a method for manufacturing an optical disk master which provides a simpler and low-cost structure for ensuring high density recording.

Another object of the present invention is to provide an optical disk which can be copied with the use of the optical disk master for high density recording.

DISCLOSURE OF INVENTION

According to the first aspect of the present invention, there is provided to an exposure method for exposing an optical disk substrate with an exposure beam and forming a spiral or concentric pit strings in the optical disk substrate, comprising the step of: directing the exposure beam on the optical disk substrate in a direction parallel to, or obliquely with respect to, the pit strings to provide a parallel or oblique path.

According to the second aspect of the present invention, there is provided to an exposure method for exposing an optical disk substrate with an exposure beam and forming a spiral or concentric pit strings in the optical disk substrate, comprising the step of: directing the exposure beam on the optical disk substrate to provide a path contacting with at least one position of the array of pits.

According to the third aspect of the present invention, there is provided to the exposure method of the second invention wherein directing the exposure beam on the optical disk substrate is performed for providing a path contacting with the pit string of the innermost side on the optical disk substrate.

According to the fourth aspect of the present invention, there is provided to the exposure method of the third invention wherein directing the exposure beam on the optical disk substrate is performed for providing a straight path.

According to the fifth aspect of the present invention, there is provided to the exposure method of the second invention wherein directing the exposure beam on the optical disk substrate is performed for providing a path contacting with the pit string of the outermost side on the optical disk substrate.

According to the sixth aspect of the present invention, there is provided to the exposure method of the third or fifth invention wherein directing the exposure beam on the optical disk substrate is performed for providing a circular arc path.

According to the seventh aspect of the present invention, there is provided to the exposure method of the second invention wherein directing the exposure beam on the optical disk substrate is performed for providing a path contacting with the pit string of the innermost side and pit string of the outermost side on the optical disk substrate.

According to the eighth aspect of the present invention, there is provided to the exposure method of the second invention wherein directing the exposure beam on the optical disk substrate is performed for providing a circular arc path having a diameter corresponding to a sum of a radius of the pit string of the innermost side and that of the pit string of the outermost side on the optical disk substrate.

According to the ninth aspect of the present invention, there is provided to the exposure method for directing an exposure beam on an optical disk substrate and forming a spiral or concentric pit strings in the optical disk substrate, comprising the step of: directing the exposure beam on the optical disk substrate to provide a circular path whose center point is within the optical disk substrate.

According to the tenth aspect of the present invention, there is provided to an exposure apparatus comprising:
  a light source for directing an exposure beam as an output on an optical disk substrate to provide a spiral or concentric pit strings;
  a first rotator mechanism for rotating the optical disk substrate; and
  a second rotator mechanism rotationally moving the first rotation mechanism and having a rotation axis located about a line passing through the optical disk substrate.

According to the eleventh aspect of the present invention, there is provided to an exposure apparatus for directing an exposure beam on an optical disk substrate and forming a spiral or concentric pit strings in the optical disk substrate, comprising:
  a light source for exiting the exposure beam;
  a table on which the optical disk substrate is placed;
  a front-side mirror at least movable up and down on an axis orthogonal to the center of the optical disk substrate and receiving the exposure beam from the light source;
  a frustoconical exposure beam mirror receiving the exposure beam from the front-side mirror and directing the exposure beam on the optical disk substrate; and
  exposure beam control means for rotating the front-side mirror and the optical disk substrate relatively to each other and for controlling an exposure beam path.

According to the twelfth aspect of the present invention, there is provided to the exposure apparatus of the eleventh embodiment wherein the front-end mirror includes a first mirror fixed with respect to the light source and has a curvature and a second mirror movable back and forth in an optical path direction to the light source and has a curvature, wherein a beam spot is created on the optical disk substrate by the first and second mirrors.

According to the thirteenth aspect of the present invention, there is provided to the exposure apparatus of the twelfth invention wherein the curvature of either the first mirror or the second mirror or of both is controlled so that a lens function of the mirror surface is adjusted.

According to the fourteenth aspect of the present invention, there is provided to the exposure apparatus of the twelfth invention wherein the first and second mirrors are provided at a back side of a cutout hinge opposite to that cutout side and the curvature of the mirror surface is controlled by controlling a voltage across piezoelectric elements at the cutout side of the cutout hinge.

According to the fifteenth aspect of the present invention, there is provided to an exposure apparatus for directing an exposure beam which is exited from an exposure beam optical head onto an optical disk substrate and forming a spiral or concentric pit strings on the optical disk substrate, comprising:
  an XY stage on which the optical head is mounted; and
  a drive control section for driving the XY stage to allow the optical head to scan the optical disk substrate in an XY direction and an exposure beam path to be formed in a direction parallel to, or obliquely with respect to, the pit string.

According to the sixteenth aspect of the present invention, there is provided to an exposure apparatus for directing an exposure beam on an optical beam substrate and forming a spiral or concentric pit strings in an optical disk substrate, comprising:

exposure beam projector for projecting the exposure beam in a direction vertical to the optical disk substrate;

a front-side mirror for reflecting the exposure beam from the exposure beam projector;

an exposure mirror arranged relative to the front-side mirror at a distance corresponding to one half of a total sum of the outermost circumference recording radius and innermost circumference recording radius on the optical disk substrate and allowing the exposure beam which is reflected on the front-side mirror to be directed in a direction vertical to the optical disk substrate surface; and moving means for relatively rotating the front-side mirror about an axis vertical to the optical disk substrate and for, in response thereto, relatively moving the exposure mirror, in a circular arc motion, around the front-side mirror while keeping that distance relative to the front-side mirror.

According to the seventeenth aspect of the present invention, there is provided to an exposure apparatus for directing an exposure beam which is exited from an exposure optical head to an optical disk substrate and forming a spiral or concentric pit strings in the optical disk substrate, comprising:

a rotator for rotating the optical disk substrate at a predetermined speed; and moving means for moving the optical head on a circular arc path inscribing the outermost circumference recording radius and circumscribing the innermost circumference recording radius of the pit string on the optical disk substrate.

According to the eighteenth aspect of the present invention, there is provided an exposure apparatus having an optical head for directing an exposure beam as an image onto an optical disk substrate, the optical head being provided opposite to a turntable rotated about a center axis of the optical disk substrate, wherein a feeder is provided for moving the optical head back and forth in a direction other than the center of the optical head.

According to the nineteenth aspect of the present invention, there is provided to an optical disk copied from an optical disk master manufactured as an optical disk substrate on which an exposure beam is directed to provide a beam shot path parallel to, or obliquely with respect to, a spiral or concentric pit strings to be formed on the optical disk substrate.

BEST MODE OF CARRYING OUT THE INVENTION (1) A first embodiment of the present invention will be explained below with reference to the accompanying drawing.

Figure 1:
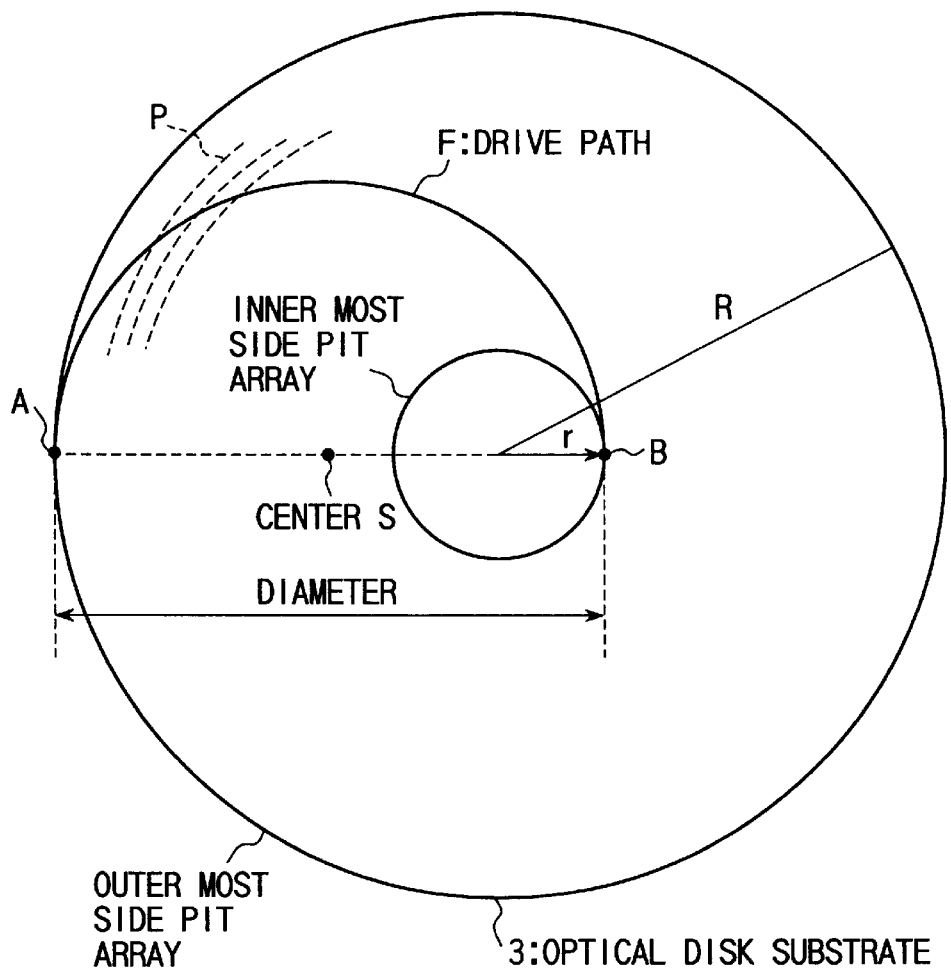
FIG. 1 is a view showing a first embodiment manufactured in accordance with an optical disk substrate exposure method of the present invention.

The beam exposure method of the present invention is carried out which, when an exposure beam, such as a laser beam, is directed to an optical disk substrate 3 as shown in FIG. 1 and, by doing so, a spiral or a concentric pit string or arrays P are formed in the optical disk substrate 3, enables the laser beam to be so directed as to provide a parallel- or oblique-direction path (a drive path F of the exposure beam optical head) relative to those pit strings P.

The laser beam exposure path preferably contacts with at least one spot on the pit string P, for example, a spot A or spot B on the path in FIG. 1.

That is, the laser beam may be so directed as to provide a path contacting at the spot B with an innermost pit string P on the optical disc substrate.

Further, the laser beam may also be so directed as to provide a path contacting at the spot A with an outermost pit string P on the optical disk substrate 3.

The laser beam is so directed onto the optical disk substrate 3 as to provide a circular arc path with a point S as a center.

The circular arc path of the laser beam has a diameter corresponding to the sum (R+r) of a radius (the innermost recording radius) r of the innermost pit array P and a radius (the outermost recording radius) R of the outermost pit string P on the optical disk substrate 3 and the center point S of the beam path is present within a plane of the optical disk substrate 3.

According to the first embodiment of the present invention, the laser beam is directed onto the optical disk substrate 3 by rotating the optical disk substrate 3 at a predetermined speed while moving the optical head along a drive path F having a diameter (R+r) and inscribing the outermost circumference recording radius R and circumscribing the innermost circumference recording radius r on the optical disc substrate 3. By doing so, a pit string or arrays are formed on the optical disk substrate and the information recording is carried out.

With respect to the drive path F of the optical head, if, for example, the outermost and innermost circumference recording radiuses R and r are set to be 60 mm and 20 mm, respectively, then the length of the drive path becomes 125.6 mm.

Figure 25:
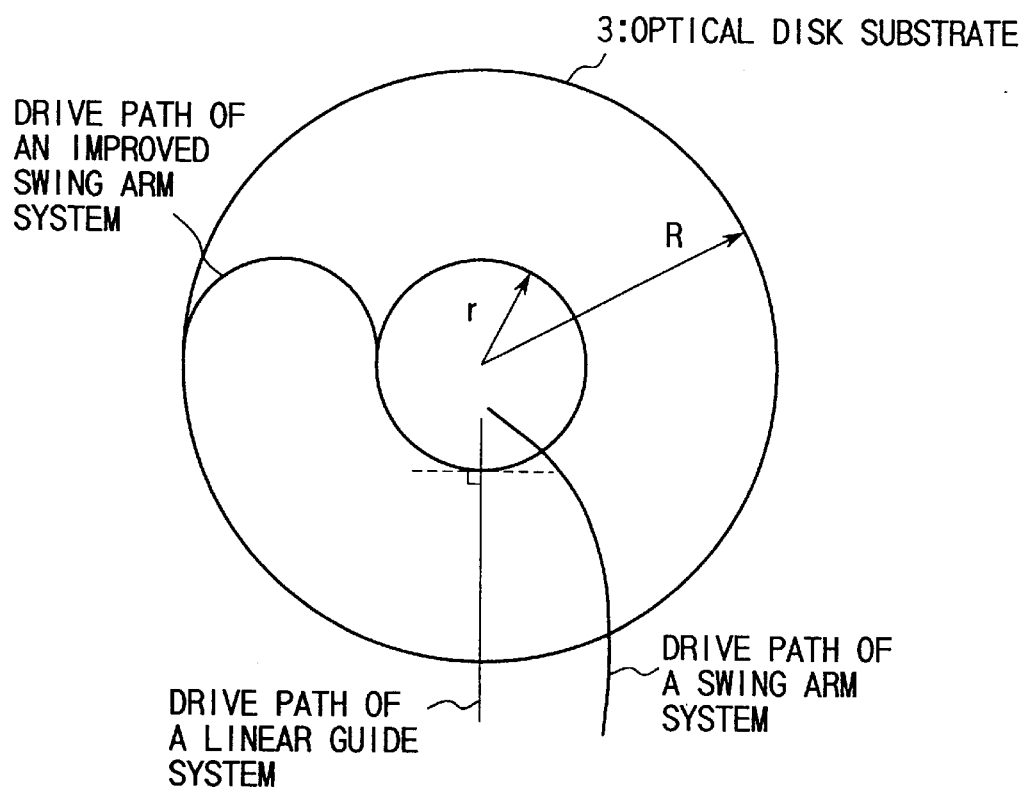
FIG. 25 is a view showing a drive path by the prior art exposure optical head.

Here, the length of the drive path becomes 40 mm for the conventional linear guide system as shown in FIG. 25 and substantially 40 mm for the swing arm system. The length of the drive path F on the present embodiment is 3.14 times as long as the respective conventional system.

When, therefore, the encoder and range finder using the conventional apparatus are directly used, a 3.14-times resolution (an error reduction to 1/3.14) is apparently obtained with respect to a track direction (pit string direction) and high-density recording can be made with a high resolution with which information is recorded on the optical disk substrate 3.

Further, if an optical disk is copied from the optical disk substrate 3, the information is recorded in a high density.

For a practical disk, the diameter becomes 80 mm or 120 mm and the actual resolution becomes much greater.

Figure 2A:
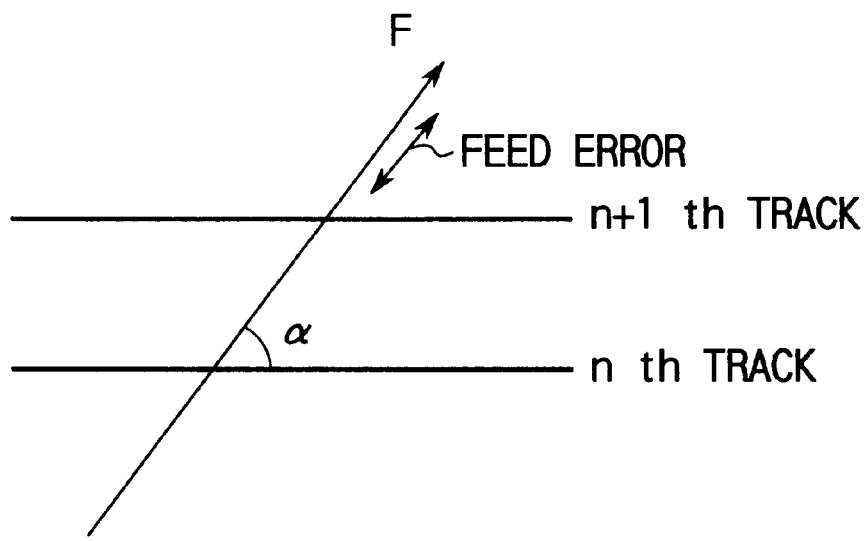
FIG. 2A is a view showing an exposure beam path on tracks formed by the exposure method.
Figure 2B:
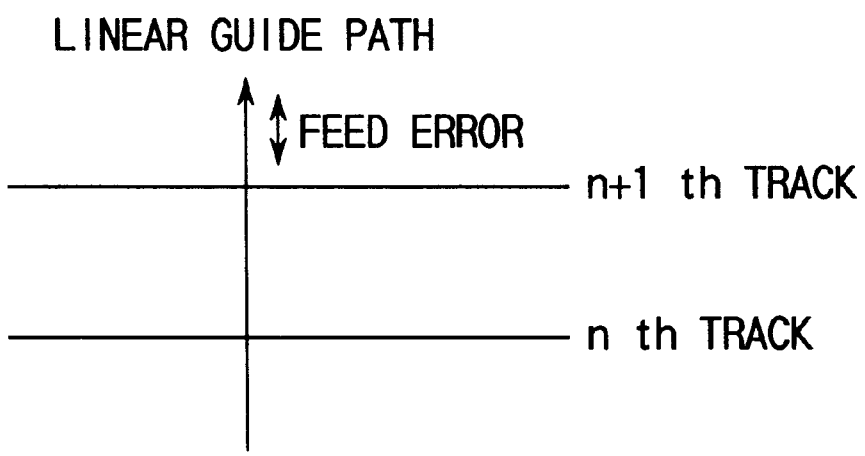
FIG. 2B is a view showing an exposure beam path on tracks formed by the exposure method.

Now with attention paid to, for example, n-th and n+1-th tracks on the optical disk substrate 3 as shown in FIG. 2A, the circular arc beam path F intersects them at an angle a in their track direction and the path length between these pit strings becomes greater than the linear guide system as appreciated from FIG. 2B.

If the path is the circular arc laser beam path F, the sensitivity is relaxed with $1/\cos(90°-\alpha)$.

Figure 3:
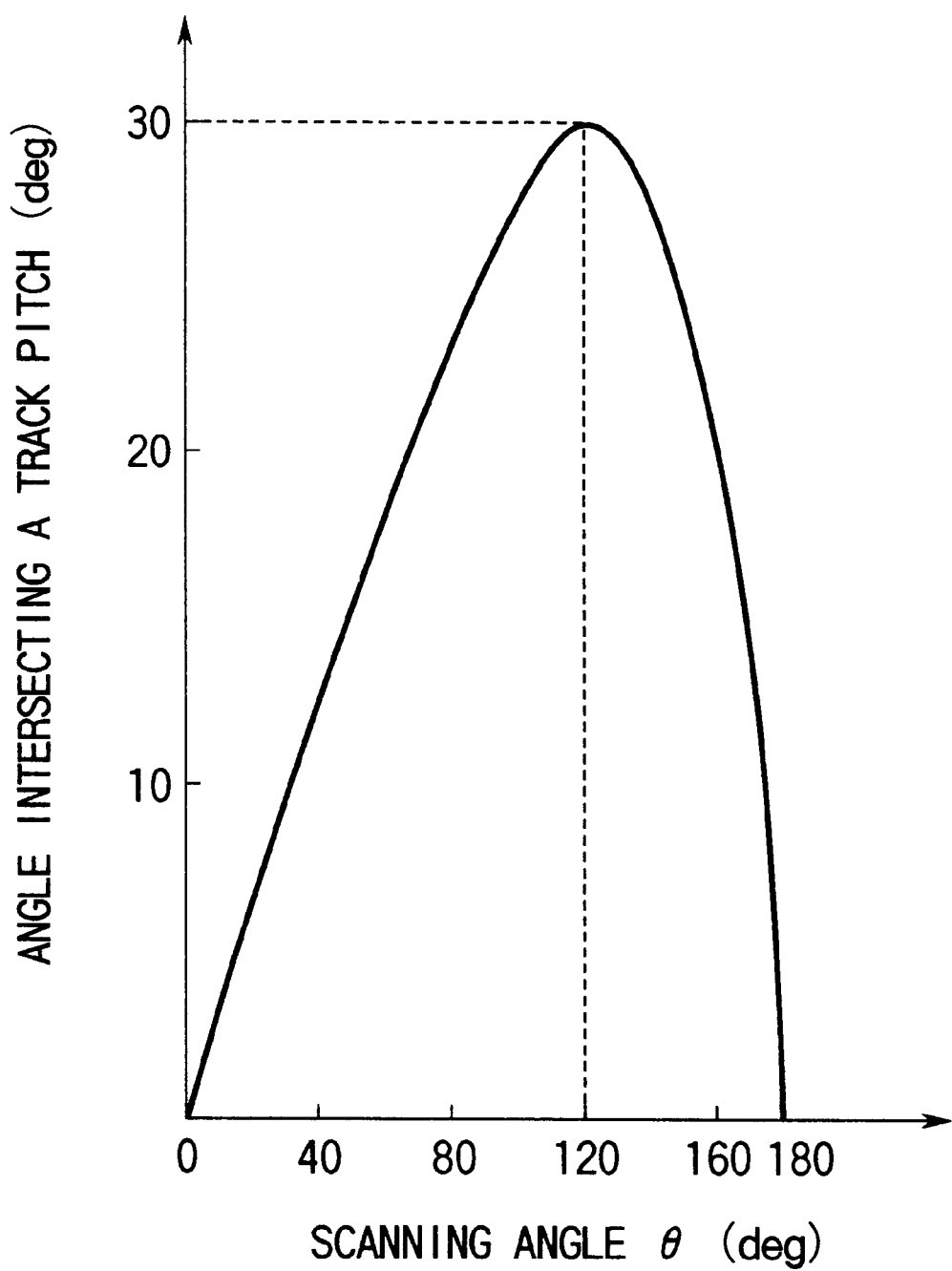
FIG. 3 is a view showing a relation between a scanning angle and an angle intersecting a track pitch.
Figure 4:
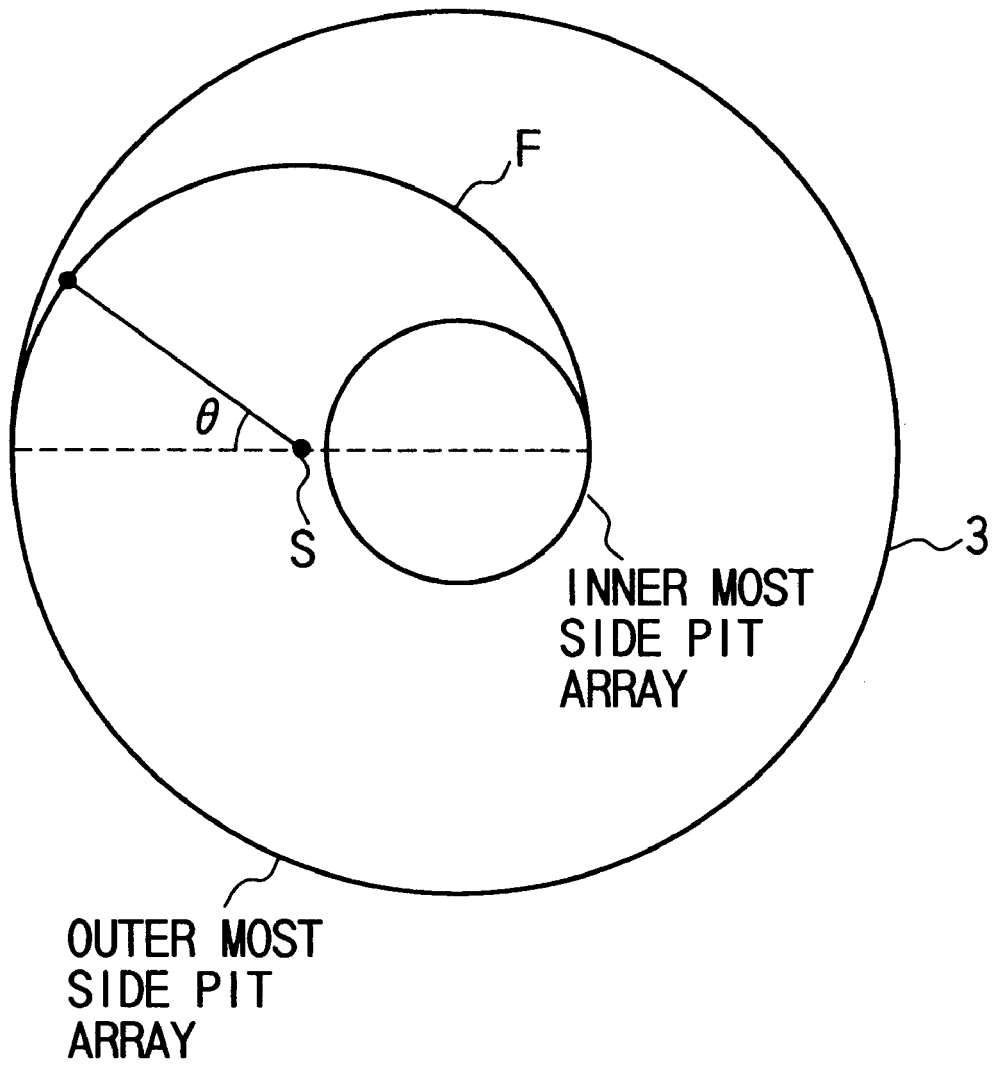
FIG. 4 is a view showing a scanning angle.

FIG. 3 shows a relation between the angle $\alpha$ intersecting the track pitch on the path F and the scanning angle $\theta$ (=0° to 180°) on the circular arc laser beam path F in FIG. 4 and, here, the angle $\alpha$ intersecting at the scanning angle $\theta$ (=120°) is shown to be 30°.

Since the intersecting angle $\alpha$ corresponds to a convex curve with $\alpha=30°$ as an extreme value, the distance of the circular arc laser beam path F across the respective tracks becomes longer and, even if there arises any irregular feed from a feeding system for instance, any adverse influence is less likely to be produced.

Figure 5:
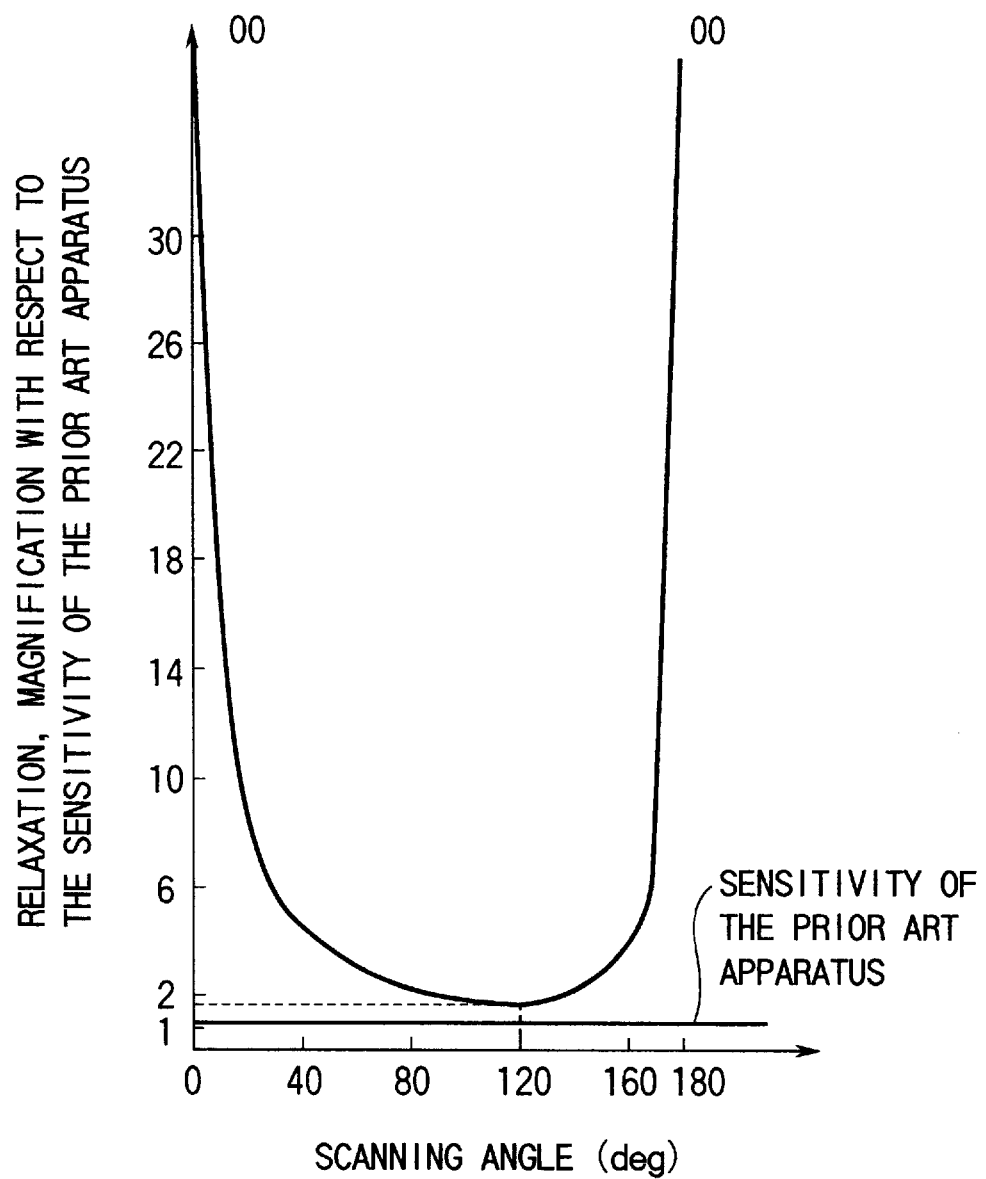
FIG. 5 shows a comparison between a scanning angle and a sensitivity of the prior technique.

FIG. 5 shows a comparison between the sensitivity for the circular arc laser beam path F and that for the prior art system (linear guide system), that is, the sensitivity for the circular arc laser beam path F when the sensitivity of the prior art system is unity.

That is, it has been found that, even when the scanning angle $\theta=120°$, the sensitivity based on the laser beam path F is 2 times as great as that based on the prior art system and, in this neighborhood, higher than the scanning angle $\theta$ (=120°).

Thus, according to the present invention, high-density recording can be made with a high resolution with which information is recorded on the optical disk substrate 3.

At the completion of exposure/recording processing on the optical disk substrate, develop-processing, etc., is done on the optical disk substrate 3 and information is transferred to an optical disk master and a metal stamper necessary to copy an optical disk is formed with the optical disk substrate used as a master.

Copying is made with the use of the metal stamper to provide an optical disk as a finished product.

According to the first embodiment of the present invention, the laser beam is directed on the optical disk substrate 3 along the circular arc path of a diameter corresponding to a sum of a radius r of the innermost circumference pit string and radius R of the outermost circumference pit string on the optical disk substrate 3, so that it is possible to record the information in a high density without any uneven track pitch.

If an optical disk is copied from such optical disk master, it is possible to record high-density information which might not otherwise been achieved in the prior art apparatus.

Since the center S of the circular arc of the laser beam is located within the optical disk substrate 3, it is possible to shorten the length of the swing arm for moving the laser beam in a circular arc path and to decrease an up/down direction oscillation at a time of directing a laser beam so that this is optimal to the recording of the information to the optical disk substrate 3 in high density.

For the linear guide or the swinging arm, the distance from its support point to the exposure optical head becomes longer and the oscillation involved imparts a greater position variation to the optical head. This variation, corresponding to rotation motion, provides a cause for varying the size of the exposure beam spot and provides an error to the motion of the exposure optical head in the track pitch direction.

When the support point is present outside the disk, a predetermined distance necessarily exits between the support point and the exposure optical head. It is possible, however, to make use of the beam exposure method of the present invention by locating the support point inside the disk and to alleviate an error caused by the rotation motion.

In this connection it is to be noted that the present invention may be applied to not only the method for exposing the optical disk substrate with the beam but also a laser beam path given below.

Figure 6:
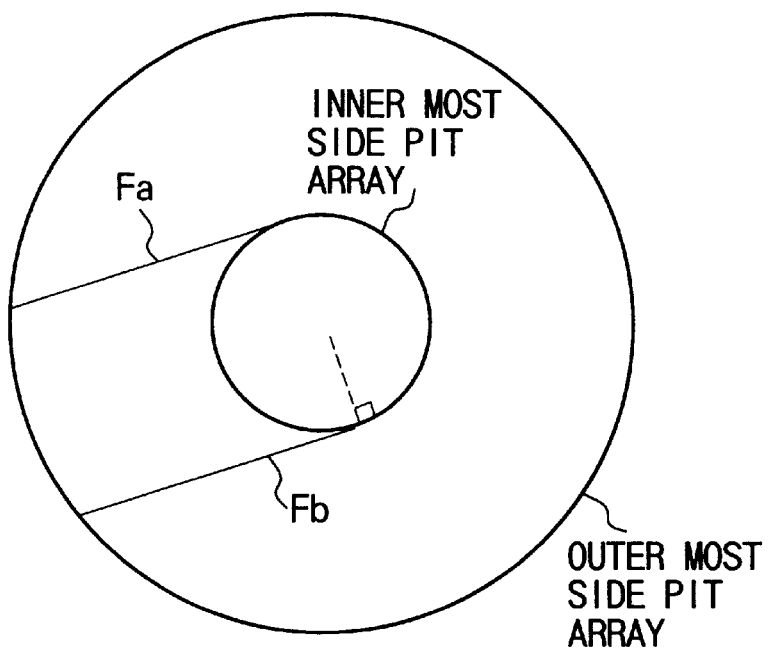
FIG. 6 is a variant of an exposure beam path.

For example, it may be possible to provide the laser beam spot as straight paths Fa, Fb in contact with the innermost pit string of the optical disk substrate 3 as shown in FIG. 6. The path Fb is situated in contact with the innermost pit string and at an angle of 90° with respect to the center of the optical disk substrate 3.

At this time, it is possible to make use of a mechanical section of the conventional linear guide system and to achieve high-density recording.

Figure 7:
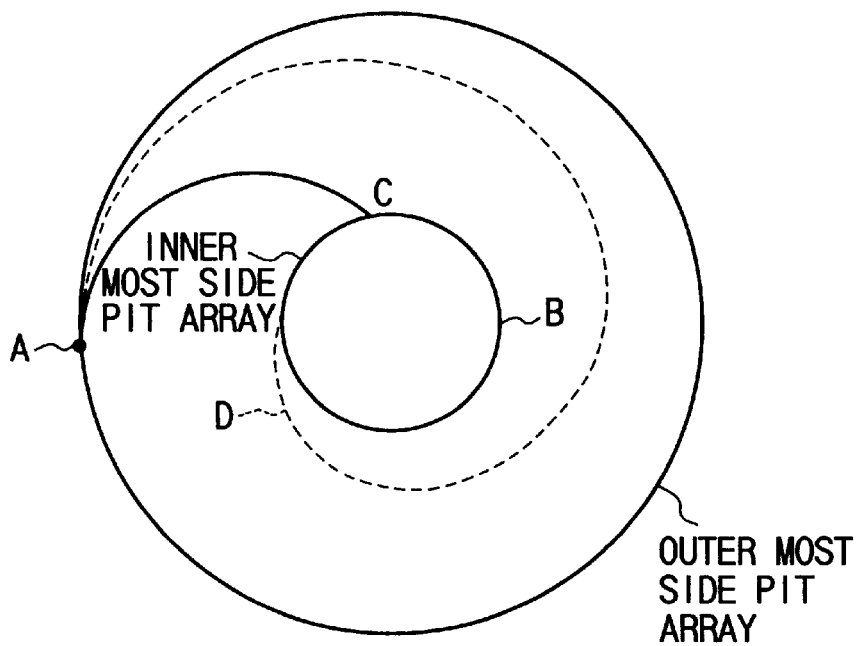
FIG. 7 is a variant of an exposure beam path.

Further, the shot path of the laser beam has only to contact with at least one site of the pit string P and it may be a circular arc contacting with a point A or C as shown, for example, in FIG. 7. Even in this case, it is possible to make a recording operation at a resolution nearer to that of the first embodiment of the present invention.

It is also possible to achieve the object of the present invention by making use of a spiral path contacting with points A, D in FIG. 7 or a spiral path as near to the pit string P as possible, a concentric path or a path of an ellipse or free-form curve.

(2) Explanation will be given below about a second embodiment of the present invention.

Figure 8:
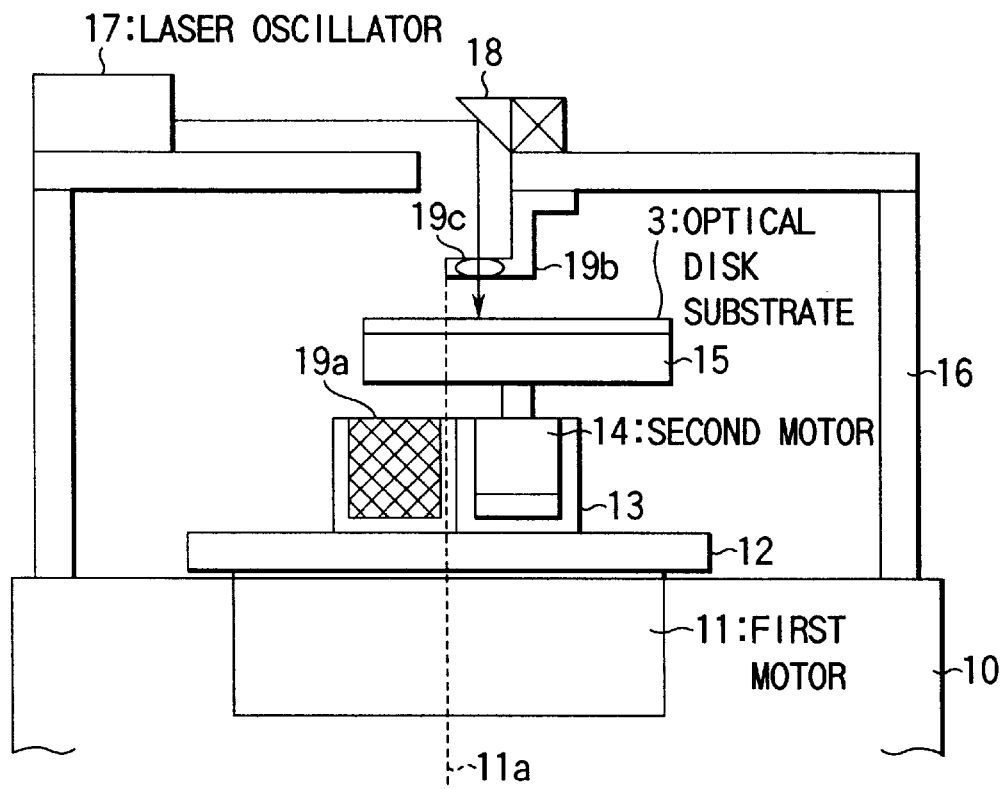
FIG. 8 is a diagrammatic view showing an optical disk substrate exposure device according to a second embodiment of the present invention.

FIG. 8 is a diagrammatic view of an optical disk substrate exposure apparatus using the optical disk substrate exposing method.

A first motor 11 is provided as a first rotation mechanism on an oscillation suppression base 10. A turntable 12 is connected to a rotation shaft of the first motor 11 and a second motor 14 serving as a second rotation mechanism is provided via a fixed member 13 at an area displaced away from the rotation shaft 11a over the turntable 12.

A turntable 15 is coupled to the rotation shaft of the second motor 14 with an optical disk 3 placed on the turntable 15.

The second motor 14 for rotating the optical disk 3 is so provided as to be displaced away from the rotation axis of the first motor 11. The rotation axis lha of the first motor 11 is so arranged as to allow a line to pass through the optical disk substrate 3. That is, the rotation axis hla of the first motor 11 is made to coincide with the center S of the drive path F in FIG. 1.

A balancer 19a the same in weight as that of the second motor 14 is provided in a position symmetrical with respect to the second motor 14.

A lens mount 19b is mounted on the optical path of a laser beam and an imaging lens 19c is mounted on the lens mount.

A laser oscillator 17 serving as an exposure beam source is mounted by support arms 16 over the base 10. A mirror 18 is arranged on an optical path of the laser beam output from the laser oscillator 17. The laser beam is reflected at the optical disk substrate 3.

The apparatus thus arranged will be explained below.

In the manufacture of the optical disk, a photoresist is coated as a photosensitive material on a glass substrate to provide an optical disk substrate 3.

Then the optical disk substrate 3 is exposed with the laser beam to form to-be-recorded information as a recess-like groove. This groove is recorded as a corresponding pit signal.

The exposing/recording is done on the optical disk substrate 3.

The optical disk substrate 3 is placed on the table 15 and rotated at a predetermined speed by driving the second motor 14.

On the other hand, the first motor 11 is rotated at a slower speed than the second motor 14.

When a laser beam is output from the laser oscillator 17, it is reflected on the mirror 18 and directed at the optical disk 3.

By doing so, the laser beam is directed onto the optical disk substrate 3 on a circular arc path F as shown in FIG. 1, that is, a path contacting at a point B with the innermost pit string and at a point A with the outermost pit string P on the optical disk substrate 3 with the center S as the center of the circular arc path.

After, in this way, exposing/recording is done on the optical disk substrate 3, develop-processing is done on the optical disk substrate 3 and then the information is transferred from the optical disc substrate 3 and a metal stamper necessary to copy an optical disk is formed with the optical disk substrate used as a master.

And copying is made with the use of the metal stamper to provide an optical disk as a finished product.

According to the second embodiment of the present invention, since the beam is so directed onto the optical disk substrate as to provide a path of a direction parallel or oblique to the pit string P, there arises no uneven track pitch. As a result, with the use of the optical disk recorded with the information at a high density and copied from the optical disk substrate 3, the information is recorded in a high density.

Further, since the center S of the circular arc as the path of the exposure beam is located inside the optical disk substrate 3, it is possible to reduce the oscillation so that optimal information recording is made in high density on the optical disk substrate 3.

(3) The third embodiment of the present invention will be explained below.

Figure 9:
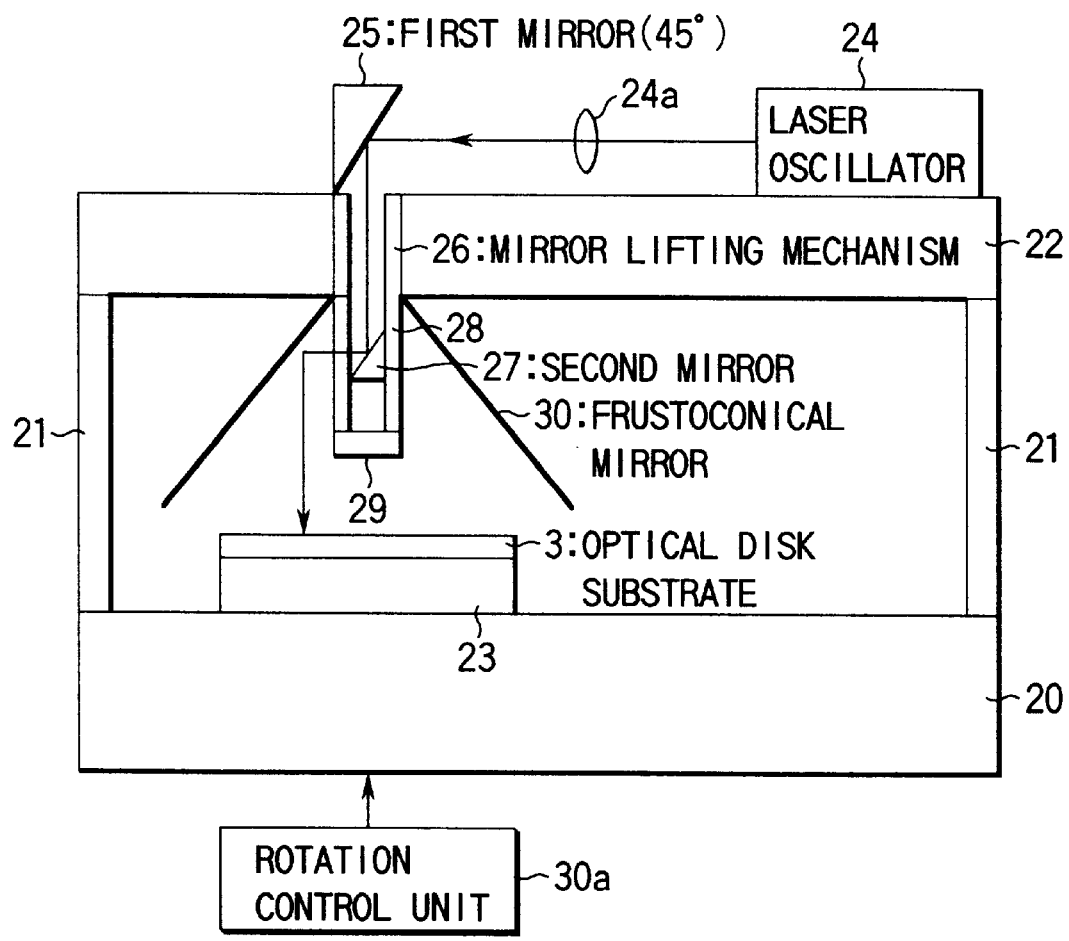
FIG. 9 is a diagrammatic view showing a third optical substrate exposure apparatus according to a third embodiment of the present invention.

FIG. 9 is a diagrammatic view showing an optical disk substrate using the optical disk substrate exposure method.

A base plate 22 is provided, via a support 21, above a base 20 to provide a double layered structure.

A rotation table 23 is provided on the base 20 and an optical disk substrate 3 is placed on the rotation table 23.

A laser oscillator 24 is mounted on the base plate 22 and serves as a beam exposure source for the optical disk substrate 3. The laser oscillator 24 outputs the laser beam in the same direction as that in which the surface of the optical disk substrate 3 extends. An optical system 24a is so arranged on a laser beam path as to allow the laser beam to be stopped down on the surface of the optical disk substrate 3.

A first mirror 25 is arranged on the base plate 22 and serves as a front-side mirror. The first mirror 25 is located on an optical path of the laser beam output from the laser oscillator 24 and on a line vertical to the surface of the optical disk substrate 3 and passing through the center of the optical disk substrate 3.

The first mirror 25 is so arranged as to provide a reflection surface oriented at an angle of 45° with respect to the surface of the optical disk substrate 3 and to allow the laser beam which is output from the laser oscillator 24 to be directed down to the center position of the optical disk substrate 3 in a direction vertical to the surface of the optical disk substrate 3.

A mirror lifting mechanism 26 is located in the downward direction of the laser beam from the first mirror 25.

The mirror lifting mechanism 26 has a guide 28 for holding a second mirror 27 serving as a front-side mirror 27 and lifting the second mirror 27 in a direction vertical to the surface of the optical disk substrate 3 and a lifting motor (not shown) for lifting the second mirror 27 along the guide 28.

The mirror lifting mechanism 26 has a rotation motor 29 with the second mirror 27 mounted on its rotation shaft. The rotation motor 29 is adapted to rotate the second mirror 27 along a rotation axis vertical to the surface of the optical disk substrate 3. The rotation motor 29 is lifted, as one unit together with the second mirror 27, by driving the lifting motor.

The mirror lifting mechanism 26 is driven in synchronism with the lifting motor and rotation motor 29 and, by driving the lifting motor and rotation motor 29, the second mirror 27 is moved downward, while rotating from an up side toward a down side.

The second mirror 27 is so arranged as to provide a 45°-oriented reflection surface with respect to a light path of the laser beam reflected from the first mirror 25, so that the laser beam reflects the laser beam in a direction parallel to the surface of the optical disk substrate 3.

A frustoconical mirror 30 is provided, as a third mirror, at a lower surface of the base plate 22.

The frustoconical mirror 30 has its mirror surface oriented at 45° to the surface of the optical disk substrate 3 from a predetermined position on a vertical line passing through the center position of the optical disk substrate 3.

The frustoconical mirror 30 allows a laser beam which comes from the second mirror 27 to be reflected in a direction vertical to the surface of the optical disk substrate 3.

A rotation control section 30a has the function for rotation-controlling the mirror lifting mechanism 26 and rotation motor 29 and, by doing so, allowing a path of the laser beam which is directed on the surface of the optical disk substrate 3 in particular to be formed as a circular arc path with its center as a center S, that is, a circular arc path contacting at a point B with the innermost pit string P and at a point A with the outermost pit string P on the optical disk substrate 3 as shown, for example, in FIG. 1.

In the case where the optical disk substrate is exposed with the laser beam such that it is set in a fixed, that is not rotated, state, the control unit controls the mirror lifting mechanism 26 and rotation motor 29 in an interlocking relation to allow the laser beam path to be described as a concentric or spiral path along a desired pit string or arrays.

The function of the thus described apparatus will be explained below.

The optical disk substrate 3 is placed on the rotation table 23.

When, on the other hand, the laser beam is output from the laser oscillator 24, it is reflected on the first mirror 25 and directed down to the center position of the optical disk substrate 3.

The laser beam is reflected in a 45° direction on the second mirror 27 and travels onto the frustoconical mirror 30 where it is reflected in a 45° direction to allow it to be directed in a direction vertical to the surface of the optical disk substrate 3.

By, at this time, rotation-controlling the mirror lifting mechanism 26 and rotation motor 29 by means of the control unit 30a, the laser beam is reflected on the second mirror 27 and frustoconical mirror 30 and directed to the surface of the optical disk substrate 3 and the laser beam path at that time provides a circular arc path with a center S, that is, a circular arc path contacting at a point B with the innermost pit string P and at a point A with the outermost pit string P on the optical disk substrate 3 as shown in FIG. 1.

When exposing/recording is done on the optical disk substrate 3, coping is made using the optical disk substrate as an optical disk master, so that an optical disk is completed as a final product.

Such an apparatus can perform the following exposing/recording operation.

The optical disk substrate 3 is placed on the fixed table 23.

When the laser beam is output from the laser oscillator 24, it is reflected on the first mirror 25 and directed toward the center position of the optical disk substrate 3.

Further, the laser beam is reflected by the second mirror 27 in the 45° direction and directed at the frustoconical mirror 30 where it is reflected in the 45° direction and shot in a direction vertical to the surface of the optical disk substrate 3.

At this time, the second mirror 27 is rotated at a constant speed, by the driving of the rotation motor 27, along a rotation axis corresponding to a vertical line passing through the center of the optical disk substrate 3. While this is so done, the optical mirror 27 is lowered at a constant speed from the upper side downward as seen from the surface of the optical disk substrate 3.

In consequence, the laser beam is reflected on the second mirror 27 and then on the frustoconical mirror 30 and directed onto the optical disk substrate 3 in which case it is scanned within a whole area from the innermost circumference recording radius r position to the outermost circumference recording radius R position of the optical disk substrate 3 over a full 360° circumference as shown in FIG. 1.

When, in this way, exposing/recording is done on the optical disk substrate 3, copying is made subsequently in the same way as above to complete an optical disk as a final product.

In the third embodiment in this way, the mirror lifting mechanism 26 and rotation motor 29 is rotation-controlled and the second mirror 27 is rotated and moved, so that the laser beam provides a shot path of a direction parallel or oblique to the pit string P. By doing so, it is possible to record information in high density without involving any uneven track pitch. And if copying is made with the use of the optical disk substrate as a master, the information is recorded in high density.

Further, the first and second mirrors 25 and 27 and frustoconical mirror 30 are so arranged that, out of these, the second mirror 27 is lifted while being rotated. It is, therefore, possible to provide a lighter-weight driving section and to obviate the need to rotate the optical disk substrate 3. It is thus possible to eliminate any nonsynchronous oscillation resulting from the displacement of the center of gravity of the optical disk substrate 3 as encountered when a spindle motor is used and hence to obviate the need to provide any centering mechanism between the optical disk substrate 3 and the spindle motor.

Since the center S of the circular arc corresponding to the path of the exposure beam is located inside the optical disk substrate 3, it is possible to shorten the exposure beam path and to achieve less oscillation when the scanning of the exposure beam is made. This is optimal to record information, in high density, on the optical disk substrate 3.

In consequence, the optical disk master thus subjected to exposing/recording processing enables information to be recorded in high density without involving any uneven track pitch.

An optical disk, being copied form the thus obtained optical disk master, ensures a high-density information recording.

(4) The fourth embodiment of the present invention will be explained below. The same reference numerals are employed to designate parts or elements corresponding to those shown in FIG. 9 and any further explanation is, therefore, omitted.

Figure 10:
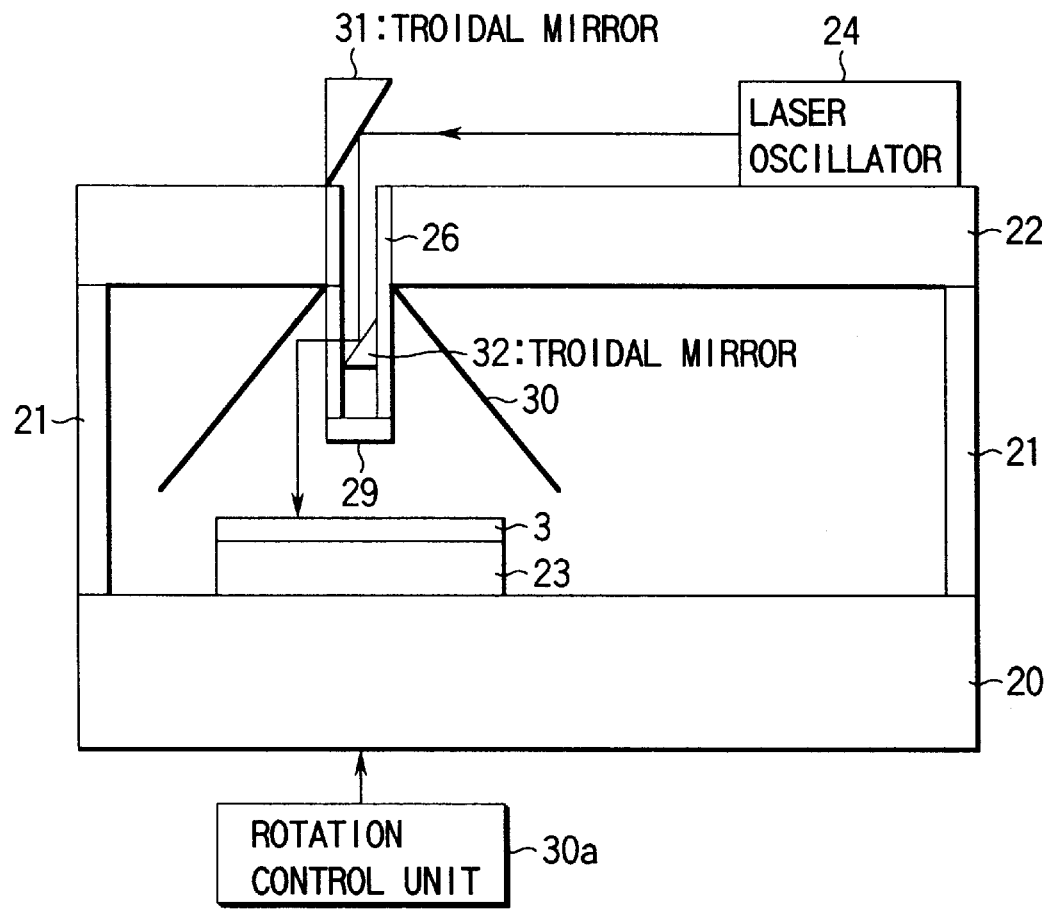
FIG. 10 is a diagrammatic view showing an optical disk substrate exposure apparatus according to a fourth embodiment of the present invention.

FIG. 10 is a diagrammatic view showing an optical disk substrate exposure apparatus using the above-mentioned optical disk substrate exposure method.

A first toroidal mirror of a concave configuration is arranged as a first mirror. The first toroidal mirror 31 provides a mirror surface of a predetermined curvature with a shorts-radius side narrowed.

Further, a second toroidal mirror 32 of a concave configuration is arranged as a second mirror. The second toroidal mirror 32 provides a mirror surface of a predetermined curvature with a short-radius side narrowed.

Figure 11:
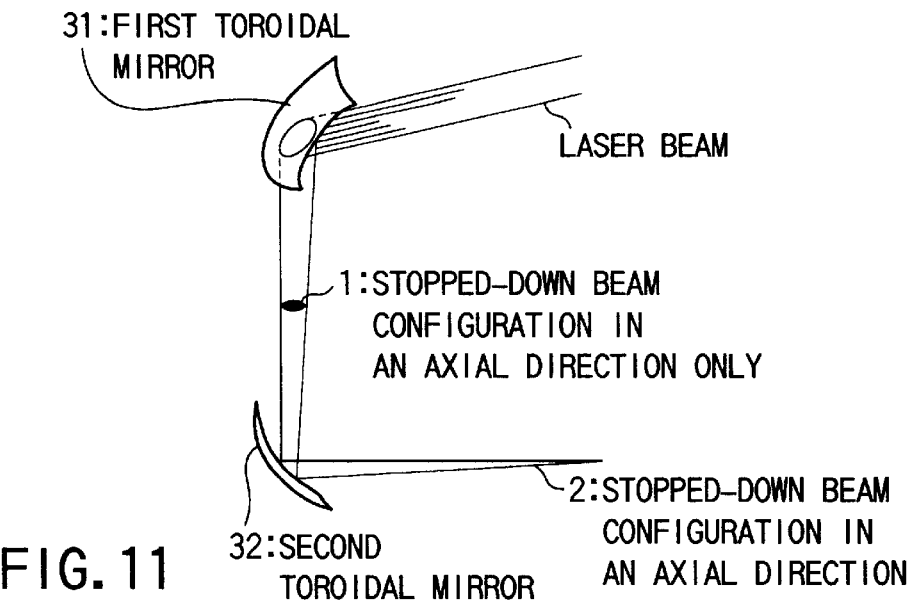
FIG. 11 is a view showing the narrowing of a laser beam spot by a toroidal mirror.

The first and second toroidal mirrors 31 and 32 narrow down a laser beam which is output from a laser oscillator 24 into a laser spot on the surface of the optical disk substrate 3 as shown in FIG. 11.

The arrangement being as set out above, exposing/recording is done on the optical disk substrate 3.

The optical disk substrate 3 is placed on a rotation table 23 and rotated at a predetermined speed.

When a laser beam is output from the laser oscillator 24, it is reflected on the first toroidal mirror 31 and down toward the center position of the optical disk substrate 3 and then reflected on the second toroidal mirror 32 in a 45° direction and down toward the surface of the optical disk substrate 3 in a vertical direction.

By the rotation control of a mirror lifting mechanism 26 and rotation motor 29 by means of a rotation control unit 30a at that time, the laser beam is reflected on the second toroidal mirror 32 and frustoconical mirror 30 and falls onto the surface of the optical disk substrate 3. In this case, the laser beam path provides a circular arc path, with a center S as a center, contacting at a point B with the innermost circumference pit string P and at a point A with the outermost circumference pit string P.

Further, the laser beam reflected on the first and second toroidal mirrors 31 and 32 provides a narrowed beam spot and is directed onto the surface of the optical disk substrate 3.

In this way, when exposing/recording is done on the optical disk substrate 3, copying is done subsequently, in the same way as above, with the use of the optical disk substrate as a master and an optical disk is completed as a final product.

On the other hand, the above apparatus can perform the following exposing/recording operation.

The optical disk substrate 3 is placed on the rotation table 23. In this case, the rotation table 23 is fixed, that is, not rotated.

When a laser beam is output from the laser oscillator 24, it is reflected on the first toroidal mirror 31 and down toward the center position of the optical disk substrate 3 and then reflected on the second toroidal mirror 32 in a 45° direction and reflected on a frustoconical mirror 30 in a 45° direction and directed onto the surface of the optical disk substrate 3 in a vertical direction.

At this time, the second toroidal mirror 32 is rotated at a constant speed, by the driving of the rotation motor 29, along a rotation axis corresponding to a vertical line passing through the center position of the optical disk substrate 3 and, together with it, is lowered at a predetermined speed from an upper side toward the lower side as seen from the surface of the optical disk substrate 3. By doing so, the laser beam path is described in a concentric or spiral way over the whole surface of the disk.

As a result, the laser beam directed onto the optical disk substrate 3 falls, as a scan beam, over a full 360° circumferential range from the innermost circumference radius r position to the outermost circumference radius R position on the optical disk substrate 3.

Further, the laser beam reflected on the first and second toroidal mirrors 31 and 32 is directed as a narrowed beam spot on the surface of the optical disk substrate 3.

In the fourth embodiment thus structured, the first and second toroidal mirrors 31 and 32 have mirror surfaces of predetermined curvatures and the laser beam is directed as a narrowed beam spot on the surface of the optical disk substrate 3. It is, therefore, possible to obtain the same advantage as in the third embodiment and to record information on the optical disk substrate 3 in much higher density.

The optical disk, being thus copied with the use of an optical disk substrate as a master, has information recorded at high density.

(5) A fifth embodiment of the present invention will be explained below. In this embodiment, the same reference numerals are employed to designate parts or elements corresponding to those shown in FIG. 9 and any further explanation is, therefore, omitted.

Figure 12:
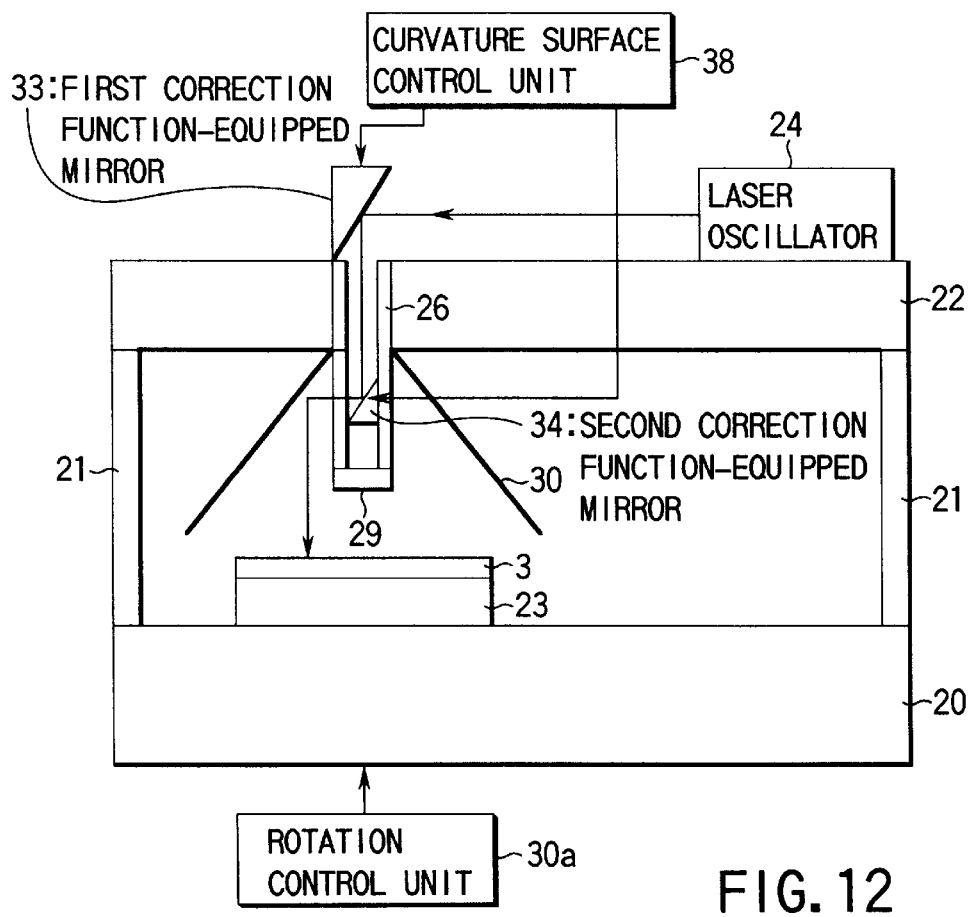
FIG. 12 is a diagrammatic view showing an optical disk substrate exposure apparatus according to a fifth embodiment of the present invention.

FIG. 12 is a diagrammatic view showing an optical disk substrate exposure apparatus using the optical disk substrate exposure method.

A first correction function-equipped mirror 33 is arranged as a first mirror and has a mirror surface curvature variable function to allow the correction of a lens function on the mirror surface.

Further, a second correction function-equipped mirror 34 is arranged as a second mirror. The mirror 34 has a mirror surface curvature variable function, as in the case of the first correction function-equipped mirror 33, to allow the correction of its lens function on the mirror surface.

Figure 13A:
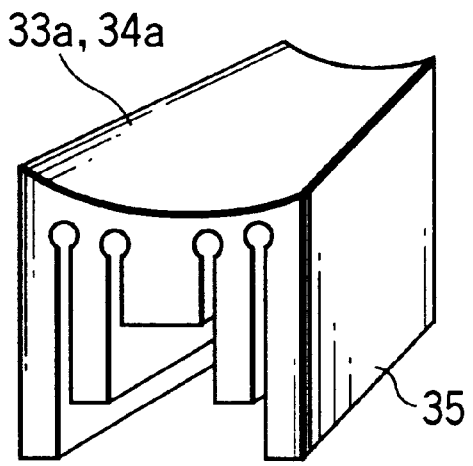
FIG. 13A is a diagrammatic view showing a practical correction function-equipped mirror.
Figure 13B:
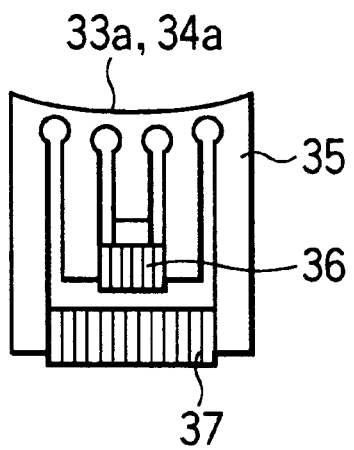
FIG. 13B is a diagrammatic view showing piezoelectric element groups in the correction function-equipped mirror.

The first and second correction function-equipped mirrors (33, 34) have mirror surfaces (33a, 34a) at a back surface of a cutout hinge 35 as shown in an outer appearance in FIG. 13A and two piezoelectric element groups 36 and 37 at different intervals on a cutout side as shown in FIG. 13B. In this connection it is to be noted that the respective piezoelectric element groups 36 and 37 are each comprised of a stack of piezoelectric elements.

On the other hand, a curvature surface control unit 38 has the function of controlling voltages on the piezoelectric element groups 36 and 37 as well as the curvature of either one or both the mirror surfaces of the first and second correction function-equipped mirrors (33, 34) and corrects a lens function on the mirror surface.

That is, the curvature surface control unit 38 has, as a table form, those voltages on the respective piezoelectric element groups 36 and 37 and has the function of reading these voltages corresponding to the lifting/lowering positions of the second correction function-equipped mirror 34 out of the table and applying them to the respective piezoelectric groups.

In this arrangement, beam exposure/recording is done on the optical disk substrate 3 as follows.

The optical disk substrate 3 is placed on the rotation table 23 and rotated at a constant speed.

When a laser beam is output from the laser oscillator 24, it is reflected on the first correction function-equipped mirror 33 and down toward the center position of the optical disk substrate.

Then the laser beam is reflected on the second correction function-equipped mirror 34 in a 45° direction and then on the frustoconical mirror 30 in a 45° direction to allow it to be directed in a vertical down direction onto the surface of the optical disk substrate 3.

By rotation-controlling the mirror lifting mechanism 26 and rotation motor 29 by means of a rotation control unit 30a, the laser beam is reflected on the second correction function-equipped mirror 34 and frustoconical mirror 30 and directed onto the optical disk substrate 3. At that time, the laser beam path provides a circular arc path, with a center S as a center, contacting at a point B with the innermost circumference pit string P and at a point A with the outermost circumference pit string P.

Further, the first and second correction function-equipped mirrors (33, 34) have a voltage, that is, a voltage on the first or second piezoelectric element group, controlled by the curvature control unit 38 to allow the control of the curvature radius on the short radius side of the mirror surface (33a, 34a).

That is, the first and second correction function-equipped mirrors (33, 34) have their curvature radius set in accordance with the lifting/lowering position of the second correction function-equipped mirror 34 to allow correction of its lens function.

Thus the laser beam directed toward the optical disk substrate 3 has its beam-condensing characteristic set on the optical disk substrate 3.

When beam exposure/recording is thus done, copying is made with the use of the optical disks substrate as a master to obtain an optical disk as a finished product.

In such an apparatus, it is possible to perform the following beam exposure/recording operation.

The optical disk substrate 3 is placed on the rotation table 23 and, in this case, the rotation mirror 23 is fixed, that is, not rotated.

When a laser beam is output from a laser oscillator 24, it is reflected on the first correction function-equipped mirror 33 and directed down toward the center position of the optical disk substrate 3.

Then the laser beam is reflected on the second correction function-equipped mirror 34 in a 45° direction and then on the frustoconical mirror 30 in a 45° direction and directed in a vertical down direction onto the surface of the optical disk substrate 3.

At this time, the second correction function-equipped mirror 34 is rotated at a constant speed about a rotation axis, by the driving of the rotation motor 29, corresponding to the center position of the optical disk substrate 3 and, together with it, lowered at a constant speed, for example, from an upper side downward as seen from the plane of the optical disk substrate 3.

Thus the laser beam directed toward the optical disk substrate 3 scans all area, over a full 360° circumference range, from the innermost circumference recording radius r position to the outermost circumference recording radius R position on the optical disk substrate 3.

Here, the first and second correction function-equipped mirrors (33, 34) have a voltage, that is, a voltage on the first or second piezoelectric element group 36 or 37, controlled by the curvature surface control unit 38 as set out above to allow the control of a short radius-side curvature radius of the mirror surface (33*a*, 34*a*).

That is, the first and second correction function-equipped mirrors (33, 34) have their curvature radius set in accordance with the lifting/lowering position of the second correction function-equipped mirror 34 to allow the correction of their lens function.

Thus the laser beam directed toward the optical disk substrate 3 provides an optimal beam condensing characteristic to the optical disk substrate 3.

In the thus structured fifth embodiment, the first and second correction function-equipped mirrors 33 and 34 are controlled to their predetermined curvatures, so that this embodiment has the same advantage as that of the second embodiment. In addition it is also possible to provide an optimal beam condensing characteristic relative to the optical disk substrate and to record information, in high density, on the optical disk substrate 3.

Further, the optical disk, being copied from such an optical disk master, has information recorded thereon in high density.

(6) Explanation will be given below about a sixth embodiment of the present invention.

Figure 14:
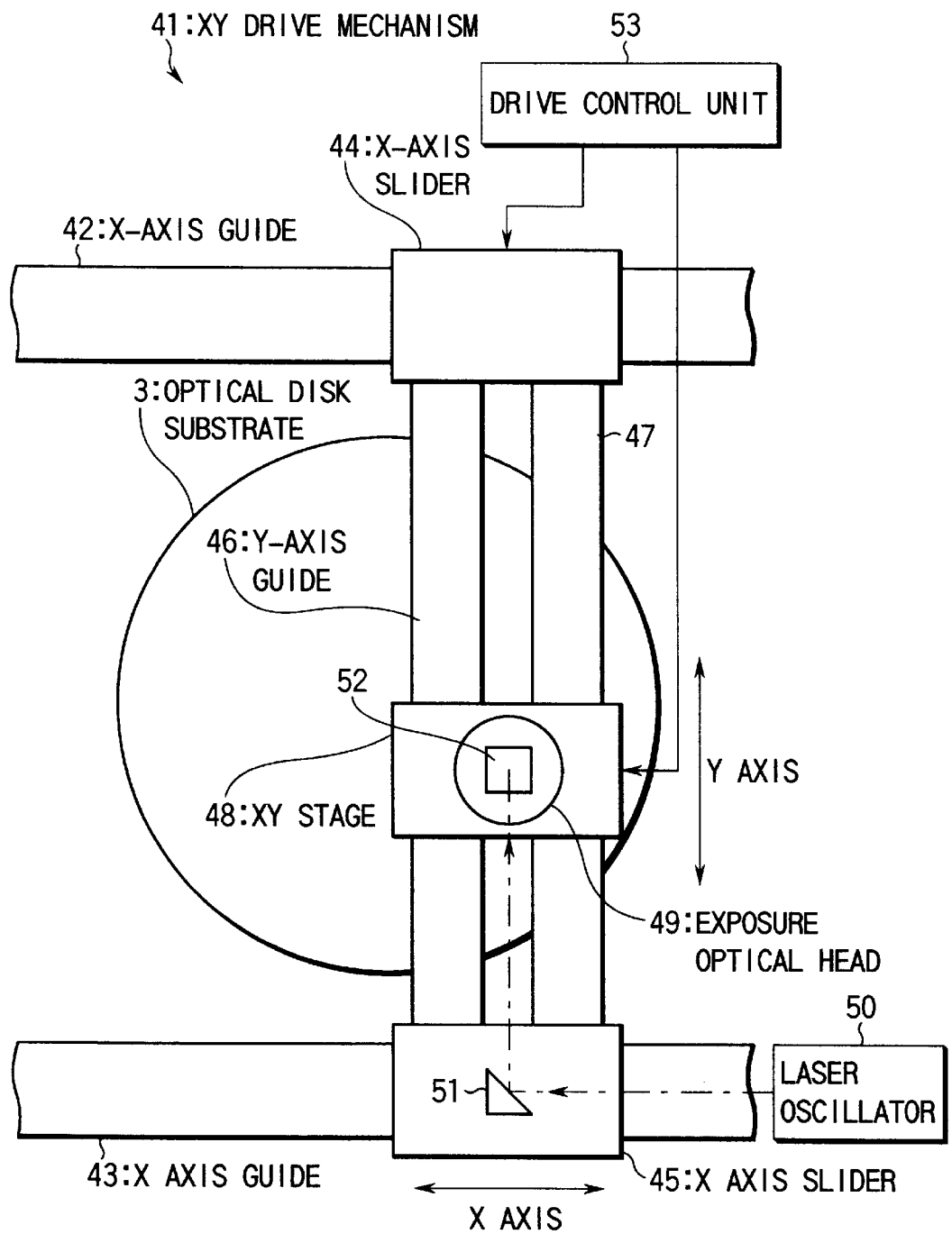
FIG. 14 is a plan view showing an arrangement of an optical disk substrate exposure apparatus according to a sixth embodiment of the present invention.
Figure 15:
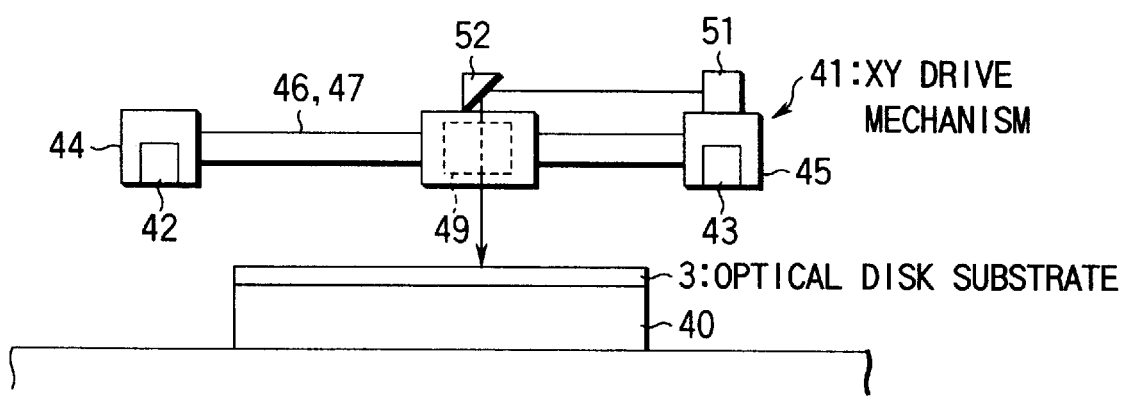
FIG. 15 is a side view showing an arrangement of the optical disk substrate exposure apparatus.

FIGS. 14 and 15 are diagrammatic views showing an optical disk substrate exposure apparatus using the optical disk substrate exposure method, FIG. 14 is a plan view as seen from above and FIG. 15 a side view.

A substrate suction base 40 has an optical disk substrate 3 placed thereon in a way to suck it in place under a vacuum suction.

An XY drive mechanism 41 is located above the substrate suction base 40. That is, a pair of X-axis guides 42 and 43 are located in a mutual parallel array at a distance greater than the diameter of the optical disk substrate 3. X-axis sliders 44 and 45 are movably fitted over the X-axis guides 42 and 43, respectively.

A pair of Y-axis guides 46 and 47 are provided in a mutually parallel array between the X-axis sliders 44 and 45.

The X-axis guides 42 and 43 and Y-axis guides 46 and 47 are provided in a mutually perpendicular relation.

An XY stage 48 is movably provided over the pair of Y-axis guides 46, 47 and a beam exposure optical head 49 is attached to the XY stage 48.

The exposure optical head 49 has a focus actuator on its object lens to allow a condensing beam spot to just focus at all times on the optical disk substrate 3.

An optical system for conducting a laser beam to the exposure optical head 49 is as follows.

A laser oscillator 50 is so arranged as to output a laser beam in an X-axis direction. A 45° mirror 51 is arranged on the X-axis slider 45 on a path of the laser beam output from the laser oscillator 50.

The 45° mirror 51 reflects the laser beam which is output from the laser oscillator 50 toward a Y-axis direction.

A 45° mirror 52 is arranged on an XY stage 48 on the reflection laser beam path.

The 45° mirror 52 is reflects the laser beam down toward the optical head 49.

On the other hand, a drive control unit 53 has such a drive control function as to issue a drive control signal to X-axis sliders 44, 45 and XY stage 48, drive the XY stage 48 under the control of an XY coordinate, scan the optical head 49 over the optical disk substrate 3 and allow, for example, a path of the laser beam which is directed to the surface of the optical disk substrate 3 to be formed as a circular arc path having a center S and contacting at a point B with the innermost circumference pit string P and at a point A with the outermost circumference pit string P on the optical disk substrate 3 as shown in FIG. 1.

The operation of the apparatus thus structured will be explained below.

In the manufacture of an optical disk, a photoresist serving as a photosensitive material is coated on a glass substrate to provide an optical disk substrate 3.

Then the optical disk substrate 3 is exposed with a laser beam to form to-be-recorded information as recessed grooves and hence record them as a pit signal.

That is, beam exposure/recording is done on the optical disks substrate 3 as follows.

The drive control unit 3 converts the positions of those pits to be recorded on the optical disk substrate 3 to an XY coordinate equivalent and moves the XY stage 48 in accordance with the XY coordinate.

The XY stage 48 is moved by the X-axis guides 42, 43 and Y-axis guides 46, 47 driven in accordance with a drive control signal whereby the optical head 49 is continuously positioned above the optical disk substrate 3 where a recording pit is recorded. Or continuous feed control is carried out.

That is, when the optical disks substrate is rotated, the optical head 49 is continuously positioned or feed-controlled so as to provide a circular arc path having a center S and contacting at a point B with the innermost circumference pit string P and at a point A with the outermost circumference pit string P on the optical disks substrate 3 as shown in FIG. 1.

When the optical head 49 is so positioned as to correspond to the respective recording position, the laser beam is output from the laser oscillator.

The laser beam is reflected on the 45° mirror 51 in the Y-axis direction and then on the 45° mirror 52 down toward the optical head 49.

The optical head 49 directs a laser beam as a just-focused, condensing beam spot onto the optical disk substrate 3.

As a result, the optical head 49 is positioned, by moving the XY stage 48, above each recording pit to be recorded on the optical disk substrate 3 so that information is recorded on the full circumference of the optical disks substrate 3.

When the optical head substrate 3 is placed on a fixed table, the XY stage 48 is moved to allow the laser beam path to be described as a concentric or spiral path along a desired pit string or arrays. Or the beam exposure can be done even with a method for raster-scanning the whole surface of the optical disk substrate from a given side to an opposite side.

When beam exposure/recording is thus done on the optical disk substrate 3, information is transferred from the optical disk substrate and with the optical disk substrate as the optical disk master, a metal stamper is formed which is necessary to the copying of an optical disk.

And copying is made with the use of the metal stamper to obtain an optical stamper as a finished product.

In the above-mentioned embodiment, the optical head 49 is positioned/controlled with the XY coordinate and, in this way, continuously positioned or feed-controlled. Like the advantage of the second embodiment, it is possible to record information in high density on the optical disk substrate 3. If this is an optical disk copied from such an optical disk master 3, then it ensures the high density recording of the information.

(7) Next explanation will be given below about a seventh embodiment of the present invention.

Figure 16:
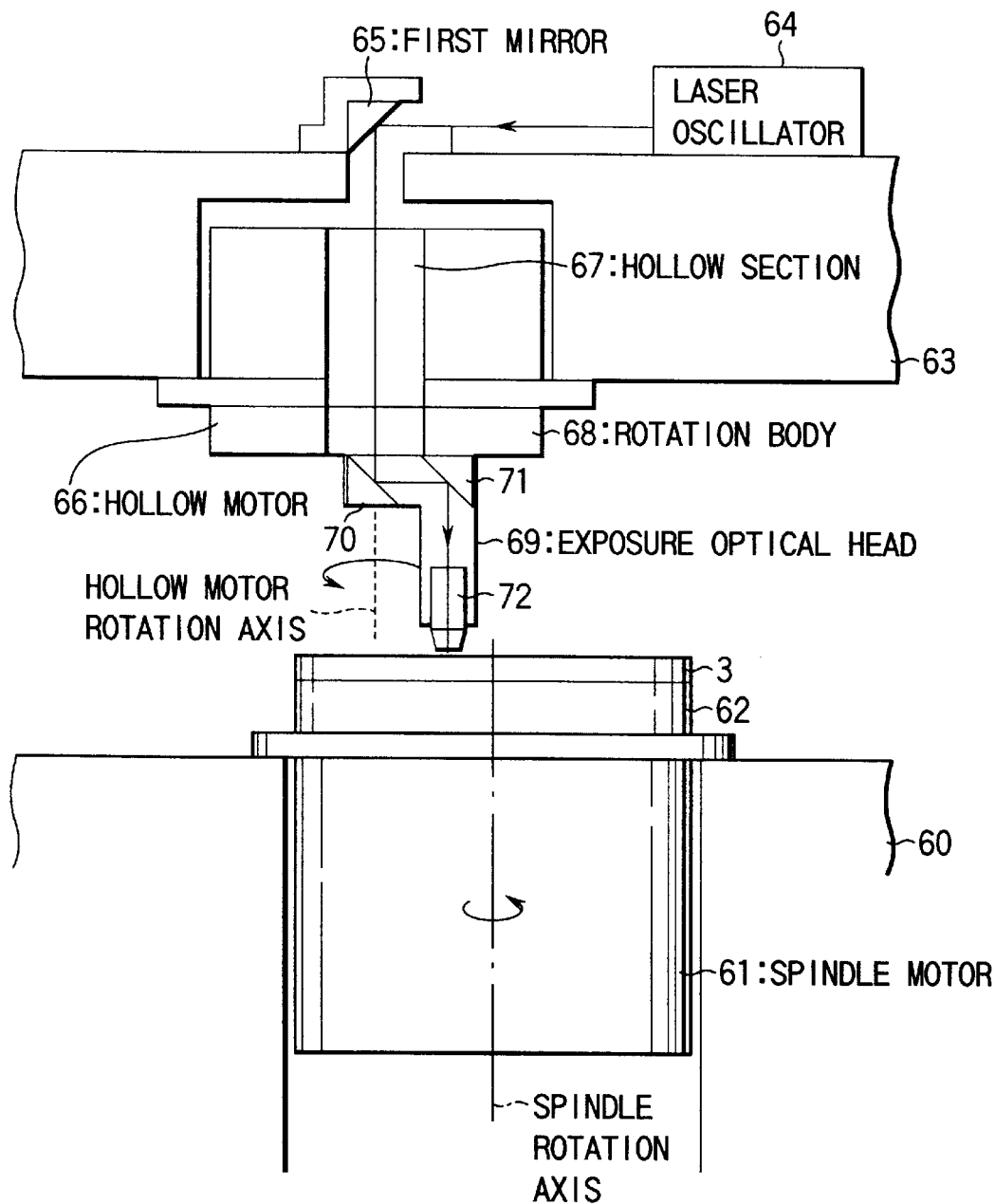
FIG. 16 is a diagrammatic view showing an optical disk substrate exposure apparatus according to a seventh embodiment of the present invention.

FIG. 16 is a diagrammatic view showing an optical disk substrate exposure apparatus using the above-mentioned optical disk substrate exposure method.

A spindle motor 61 serving as a rotation mechanism is arranged at a base 60. A turntable 62 is mounted on a rotation shaft of the spindle motor 61.

The turntable 62 has a suction surface and, with an optical disk substrate 3 placed thereon, vacuumsuction it and fixed it in place.

A base plate 63 is disposed above the base 20 and a laser oscillator 64 is provided on the upper surface of the base plate 63 to output a laser beam as an exposure beam.

A first mirror 65 is arranged on an optical path of a laser beam from the laser oscillator 64 and reflects the beam in a vertical down direction to the surface of the optical disk substrate 3. The first mirror 65 is so arranged as to have a 45° surface with respect to the laser beam path.

A hollow motor 66 is mounted at the lower surface of the base plate 63 and provides a rotation axis for the optical path of the laser beam reflected on the first mirror 65.

The hollow motor 66 functions as a circular arc moving means and provides a hollow section 67 through which the laser beam reflected on the first mirror 65 passes. The hollow motor 66 has a rotation body 68 at its circumference section and it is rotated about the rotation axis of the hollow motor. An exposure optical head 69 is provided on the lower surface of the hollow motor 66.

The optical head 69 comprises a second mirror 70, a third mirror 71 and an object lens 72.

Of these, the second mirror 70 has its mirror surface oriented at 45° with respect to the surface of the optical disk substrate 3, so that a laser beam reflected down on the first mirror 65 is reflected in a horizontal direction to the optical disk substrate.

The third mirror 71 is arranged relative to the second mirror 70 at a distance corresponding to one half the total distance of the outermost circumference recording radius R and innermost circumference recording radius r on the optical disk substrate 3.

The third mirror 71 has its mirror surface oriented at 45° with respect to the surface of the optical disk substrate 3 and the laser beam reflected on the second mirror 70 is reflected down toward the optical disk substrate 3.

The objective lens 72 is arranged on an optical path of the laser beam coming from the third mirror 71 and has a focusing actuator, so that it allows the laser beam to be directed as a just-focused, condensing beam spot onto the optical disk substrate 3 at all times.

Here, when the hollow motor 66 is rotated, the second mirror 70 in the optical head 69 is rotated about the rotation axis of the hollow motor 66 and, together therewith, the second mirror 71 and object lens 72 are moved as one unit over a circular arc with the second mirror 70 as a center.

That is, the object lens 72 of the optical head 69 is moved on a drive path F inscribing the outermost circumference recording radius R and circumscribing the innermost circumference recording radius r as shown in FIG. 1.

The function of the thus structure apparatus will be explained below.

In the manufacturing the optical disk, a photoresist is coated as a photosensitive material on a glass substrate to provide an optical disk substrate 3.

Then the optical disk substrate 3 is exposed with the laser beam to form to-be-recorded information as recessed grooves and hence the grooves as a pit signal.

The beam exposure/recording is done on the optical disk substrate 3 as follows.

When the spindle motor 61 is rotated at a predetermined rotation speed, the turntable 62 is rotated at a constant rotation speed in response thereto to allow the sucked/fixed optical disk substrate 3 to be rotated at a constant rotation speed.

On the other hand, when a laser beam is output from the laser oscillator 64, it is reflected on the first mirror 65 and, down the hollow section 67 of the hollow motor 66, reaches the mirror 70 of the optical head 69.

And the laser beam is reflected on the second mirror 70 in a horizontal direction and then down on the third mirror 71 to allow it to be directed, as a just focused, condensing beam spot onto the optical disk substrate.

At this time, the hollow motor 66 is rotationally driven at a predetermined rotation speed. By the rotational drive of the hollow motor 66, the second mirror 71 and object lens 72 are moved, as one unit, on a circular arc with the second mirror 70 as a center.

That is, the object lens 72 of the optical head 69 is moved over a drive path F inscribing the outermost circumference recording radius R and circumscribing the innermost circumference radius r as shown in FIG. 1. The drive path F provides a circular arc with a diameter of, for example, (R+r).

When, thus, beam exposure/recording is done on the optical disk substrate 3, information is transferred from the optical disk substrate 3 and, with this as an optical disk master, a metal stamper is formed as one necessary to the copying of an optical disk.

Copying is done with the use of the metal stamper to obtain an optical disk as a finished product.

According to the seventh embodiment of the present invention, it is possible to obtain an apparently high resolution (reduce an error to 1/3.14) in a track direction.

Since the center S of a circular arc as a laser beam path is located inside the optical disk substrate 3, the distance between the second mirror 70 and the third mirror 71 is made short, so that it is possible to reduce an oscillation upon the directing of the laser beam and hence to ensure high-density information recording on the optical disk substrate.

Further, if an optical disk is copied from such an optical disk master, it ensures high-density information recording.

(8) Then explanation will be given below about an eighth embodiment of the present invention, noting that the same reference numerals are employed to designate parts or elements corresponding to those shown in FIG. 16, further explanation being, therefore, omitted.

Figure 17:
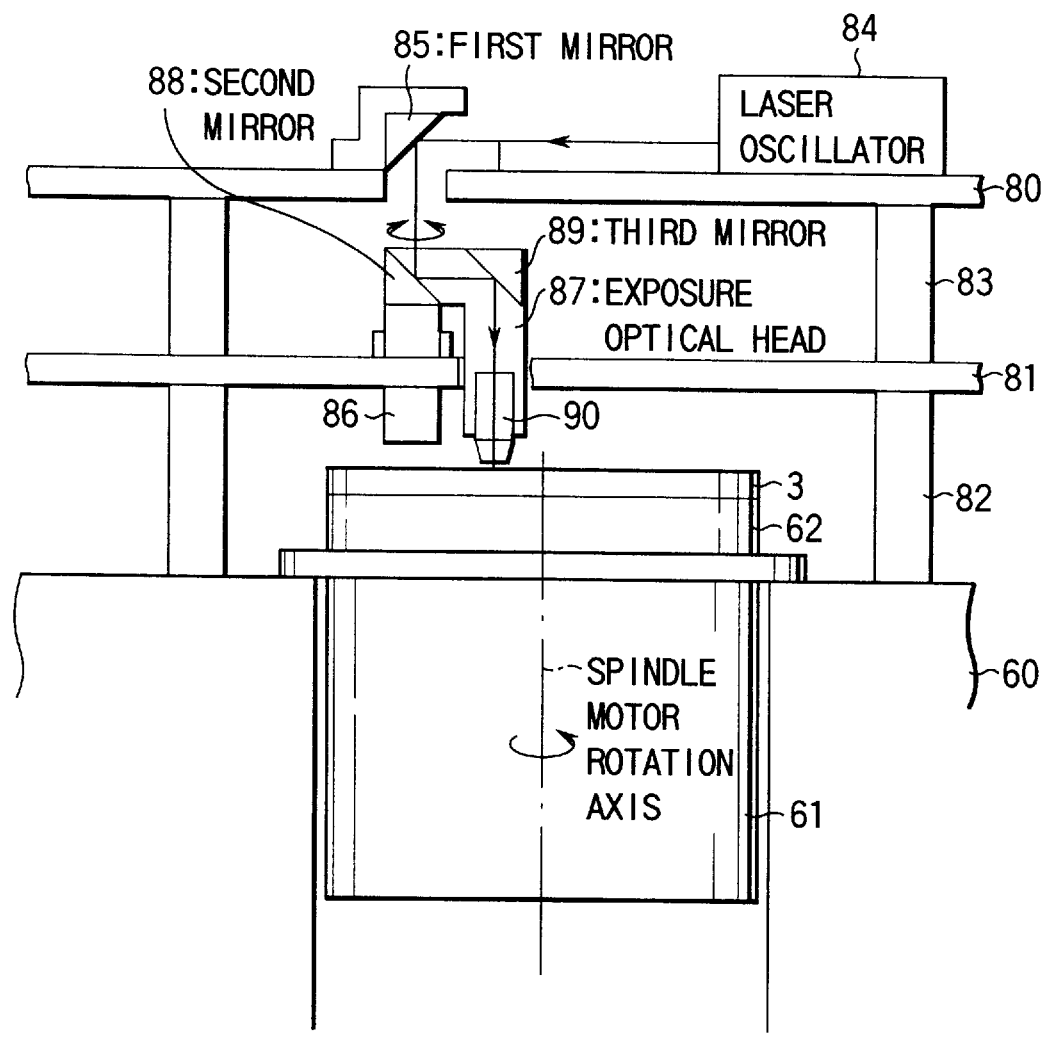
FIG. 17 is a diagrammatic view showing an arrangement of an optical disk substrate exposure apparatus according to an eighth embodiment of the present invention.

FIG. 17 is a diagrammatic view showing an optical disk substrate exposure apparatus using the optical disk substrate exposure method.

A pair of base plates 80, 81 are supported, by support members 82, 83, on a base 60 with a predetermined distance left therebetween.

Of these, a laser oscillator 84 is provided on an upper one 80 of these base plates and a first mirror 85 is arranged on an optical path of a laser beam output from the laser oscillator 84.

A motor 86 is mounted on the lower base plate 81 and a beam exposure optical head 87 is coupled to a rotation shaft of the motor 86.

The optical head 87 comprises a second mirror 88, a third mirror 89 and an object lens 90.

Of these, the second mirror 88 has its mirror surface oriented at 45° with respect to the surface of the optical disk substrate 3 to allow a laser beam which is reflected on the first mirror 85 to be reflected in a horizontal direction to the optical disk.

The third mirror 89 is arranged relative to the second mirror 88 at a distance corresponding to one half the total distance of the outermost circumference recording radius R and innermost circumference recording radius r on the optical disk substrate.

Further, the third mirror 89 has its mirror surface oriented at 45° with respect to the surface of the optical disk substrate 3 to allow the laser beam which is reflected on the second mirror 88 to be directed down to the optical disk substrate 3.

An object lens 90 is arranged on an optical path of the laser beam from the third mirror 89 and equipped with a focus actuator to allow the laser beam to be directed as a just-focused, condensing beam spot on the optical disk substrate 3 at all times.

Here, when the motor 86 is rotated, the second mirror 88 in the optical head 87 is rotated about the rotation shaft of the motor 86 and, together therewith, the second mirror 88 and object lens 90 are moves, as one unit, on a circular arc with the second mirror 88 as a center.

That is, the object lens 90 of the optical head 87 is moved on a drive path F inscribing the outermost circumference recording radius R and circumscribing the innermost circumference recording radius r as shown in FIG. 1.

The operation of the thus structured apparatus will be explained below.

In the manufacture of an optical disk, when a spindle motor 61 is rotated at a constant rotation speed, a turntable 62 is rotated at a constant rotation speed in response thereto to allow the optical disk substrate 3 which is sucked/fixed in place to be rotated at a constant rotation speed.

When, on the other hand, the laser beam is output from the laser oscillator 84, it is reflected on the first mirror 85 in a downward direction and reaches the second mirror 88 in the optical head 87.

And the laser beam is reflected on the second mirror 88 in a 45° direction and then on the third mirror 89 and directed, by the object lens 90, as a just-focused, condensing beam spot on the optical disk substrate 3.

At this time, since the motor 86 is rotationally driven at a predetermined speed, the third mirror 89 and object lens 90 are moves, as one unit, in a circular path with the second mirror 88 as a center.

That is, the object lens 90 of the optical head 87 is moved on a drive path F inscribing the outermost circumference recording radius R and circumscribing the innermost recording radius r as shown in FIG. 1. The drive path F provides a circular arc path with (R+r) as a diameter.

When beam exposure/recording is thus done on the optical disk substrate 3, information is transferred from the optical disk substrate 3 and, with this as an optical disk master, a metal stamper necessary to the copying of the optical disk is formed.

Copying is made with the use of the metal stamper to provide an optical disk as a finished product.

According to the eighth embodiment, it is possible to obtain an apparently high resolution (reduce an error to 1/3.14) relative to a track direction as in the seventh embodiment of the present invention and to achieve high resolution at a time of recording information on the optical disk substrate 3 and hence achieve high-density recording.

Further, since the center S of the circular arc as a laser beam path is located inside the optical disk substrate 3, the distance between the second mirror 88 and the third mirror 89 is shortened. By doing so it is possible to reduce an oscillation upon exposure with the laser beam and high-density information recording on the optical disk substrate 3 is optimally done.

Further, if this is an optical disk copied with the use of the optical disk master, then it ensures high-density information recording.

The seventh and eighth embodiments may be varied as follows.

In the seventh and eighth embodiments, the optical head (69, 87) is rotated to move the object lens (72, 90) on a drive path F inscribing the outermost circumference recording radius R and circumscribing the innermost circumference recording radius r as shown in FIG. 1. However, the spindle motor 61 side may be rotated, with the optical head (69, 87) fixed, to allow the laser beam path on the optical disk substrate 3 to correspond to the drive path F as shown in FIG. 1. Even if this is so done, this arrangement can ensure the same advantage as obtained in the seventh and eighth embodiments.

(9) Explanation will now be given below about a ninth embodiment of the present invention.

Figure 18:
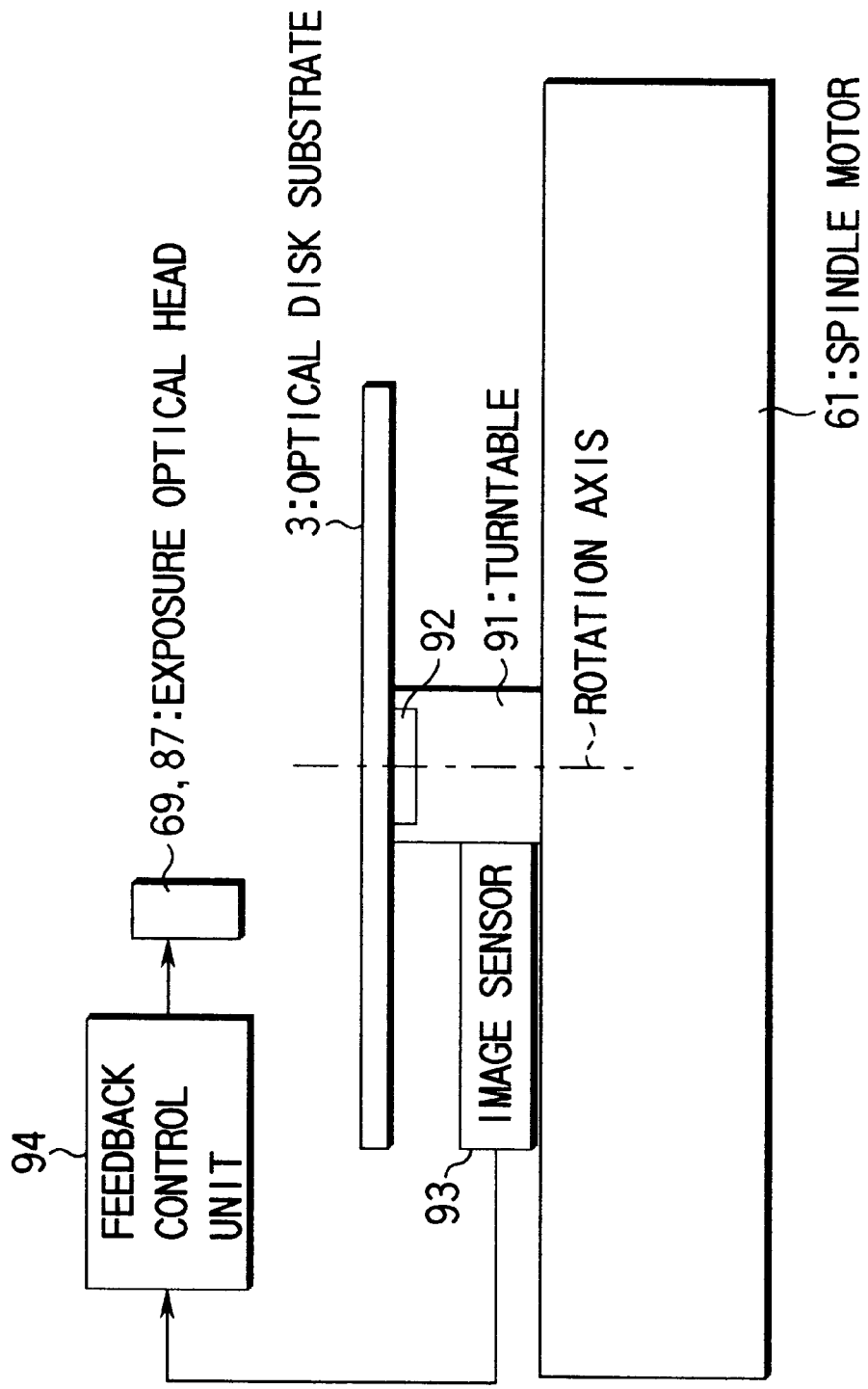
FIG. 18 is a diagrammatic view showing an optical disk substrate exposure apparatus according to a ninth embodiment of the present invention.

FIG. 18 is a view showing a turntable, such as a rotation table 23, and its neighborhood, having an optical disk substrate 3 placed on an optical disk substrate exposure apparatus. Here, explanation will be given below a case applied to the seventh and eighth embodiment.

A turntable 91 is coupled to the rotation shaft of a spindle motor 61. The turntable 91 has a groove means of a suction mechanism 92 for sucking an optical disk substrate 3 at an area smaller than that inside an innermost circumference recording radius r on the optical disk substrate 3.

An image sensor 93 is provided as an exposure light sensor below a surface side opposite to a surface side on the optical disk substrate 3 where a laser beam is directed.

Figure 19:
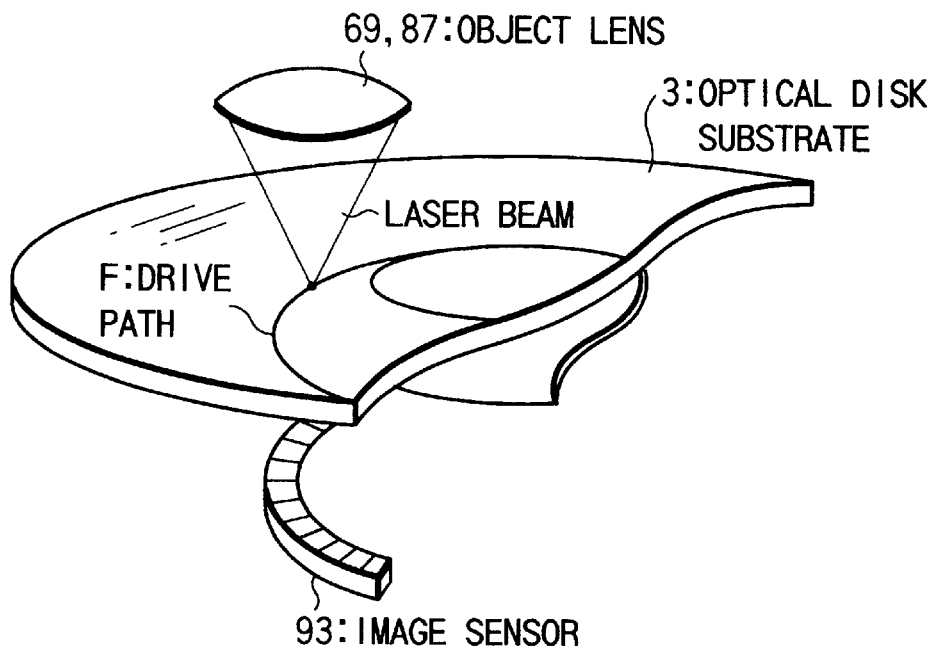
FIG. 19 is an external view showing an arrangement of an image sensor.

The image sensor 93 is comprised of an array of light sensitive elements and so formed as to have a circular arc configuration corresponding to a drive path F of an object lens in the exposure optical head (69, 87) as shown, for example, in FIG. 19.

The image sensor 93 receives a laser beam transmitted through the optical disk substrate 3 and outputs a received beam signal corresponding to that beam-received position.

A feedback control unit 94 has the function of receiving a reception signal from the image sensor 93, detecting a condensing spot position of the laser beam directed to the optical disk substrate 3 from the reception signal, finding the difference between the condensing spot position and a spot setting position and positioning the optical head (69, 87) so as to have the difference cease to exist.

The feedback control unit 94 counts reference clocks upon the movement of the optical heads 69, 87 in accordance with the drive path F and allows the spot setting position corresponding to the count value to be initially set.

The arrangement thus shown has not only the advantages of the seventh and eighth embodiments but also the following advantage.

That is, the suction mechanism 92 for sucking the optical disk substrate 3 sucks the optical disk substrate 3 at a narrower area than an area inside the innermost circumference recording radius r on the optical disk substrate 3 and a space is created below a lower surface of the optical disk substrate 3 corresponding to a recording area on the optical disk substrate 3. Therefore, the laser beam at a time of beam exposure/recording on the optical disk substrate 3, even if being transmitted through the optical disk substrate 3, is not reflected back to the optical disk substrate 3.

It is, therefore, possible to completely avoid any uneven exposure of the beam on the optical disk substrate 3 at a time of beam exposure/recording.

Figure 20:
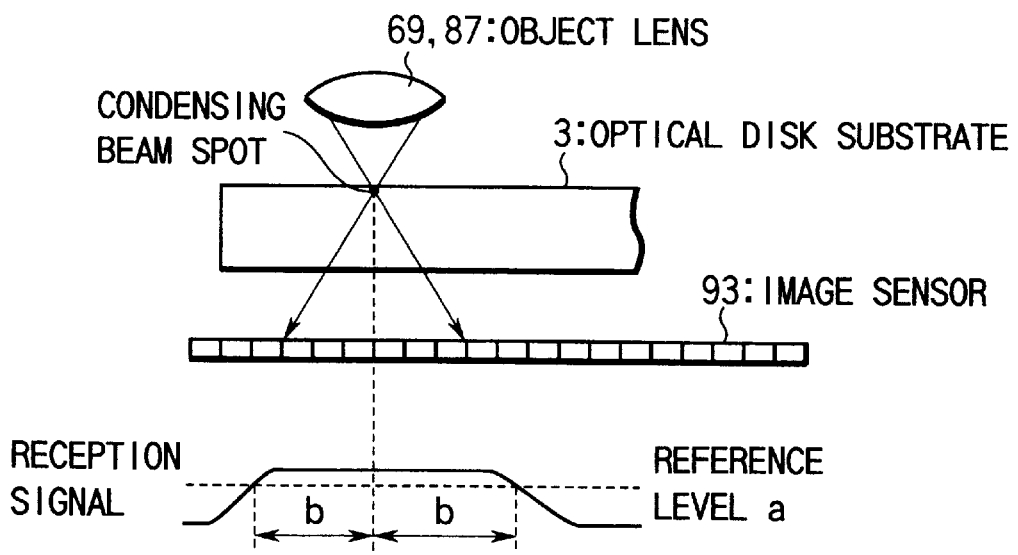
FIG. 20 is a view showing a beam reception function of an image sensor.

Further, the laser beam transmitted through the optical disk substrate 3 is incident onto the image sensor 93 at a broader angle as shown in FIG. 20.

The image sensor 93 has the laser beam of the broader angle, that is, the laser beam transmitted through the optical disk substrate 3, received at a plurality of reception elements and outputs those received signals corresponding to the beam-received positions.

The feedback control unit 94 receives the reception signal output from the image sensor 93, compares the reception signal and an initially set reference level a and estimates, as a laser beam condensing spot position, an intermediate position ($2b/2$) of the reception signal exceeding the reference level a.

And the feedback control unit 94 finds the difference between the condensing beam spot position and the spot setting position and positions the optical head (69, 87) so that the difference ceases to exit. According to the ninth embodiment, it is possible to obtain the advantage of the eighth embodiment and to prevent any uneven beam exposure on the optical disk substrate 3. It is also possible to control the laser beam condensing spot to a predetermined position through the positioning of the optical head (69, 87) and further to achieve high-density information recording.

If an optical disk is one manufactured using such an optical disk master, it ensures high-density information recording.

(10) Explanation will be given below about a tenth embodiment of the present invention.

The tenth embodiment is directed to an optical disk substrate exposure method by which the suction of the optical disk substrate is improved.

This optical disk substrate exposure method comprises a first step of setting a suction surface of a turntable in an atmospheric state when an optical disk substrate 3 is placed on the turntable, a second step of setting a state between the suction surface of the turntable and the optical disk substrate 3 in a positive pressure state after the first step, and a third step reaching a predetermined vacuum state at a plurality of vacuum stages between the suction surface of the turntable and the optical disk substrate 3 after the second step whereby, after the third step, information is recorded on the optical disk substrate 3 through the exposure of a laser beam.

Figure 21:
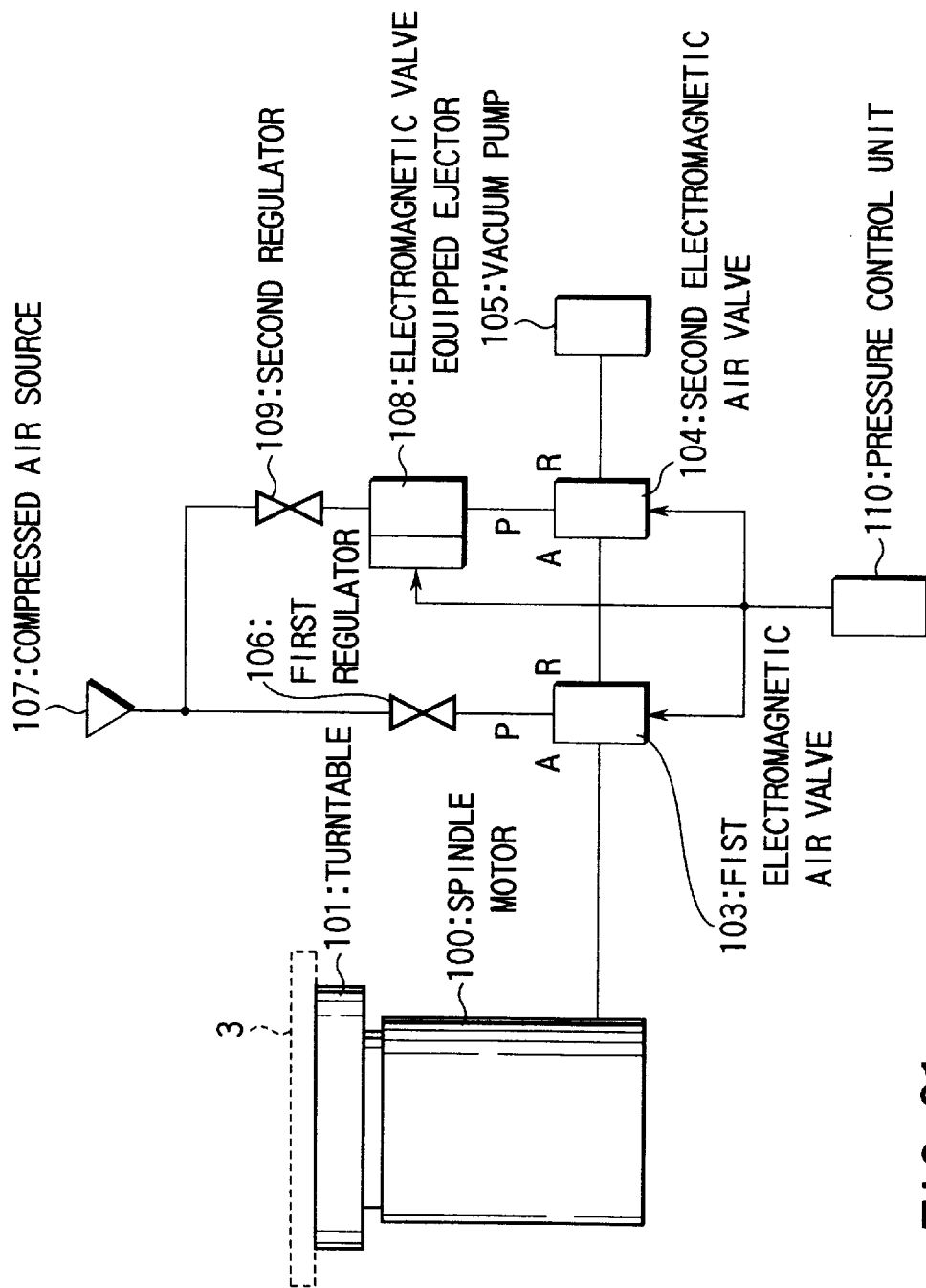
FIG. 21 is a view showing a suction mechanism in an optical disk substrate exposure apparatus according to a tenth embodiment of the present invention.

FIG. 21 is a diagrammatic view showing a suction mechanism of an optical disk substrate exposure apparatus using such an optical disk substrate suction method.

A turntable 101 is coupled to a rotation shaft of a spindle motor 100 and an optical disk substrate 3 is sucked/fixed in place on the turntable 101.

Figure 22:
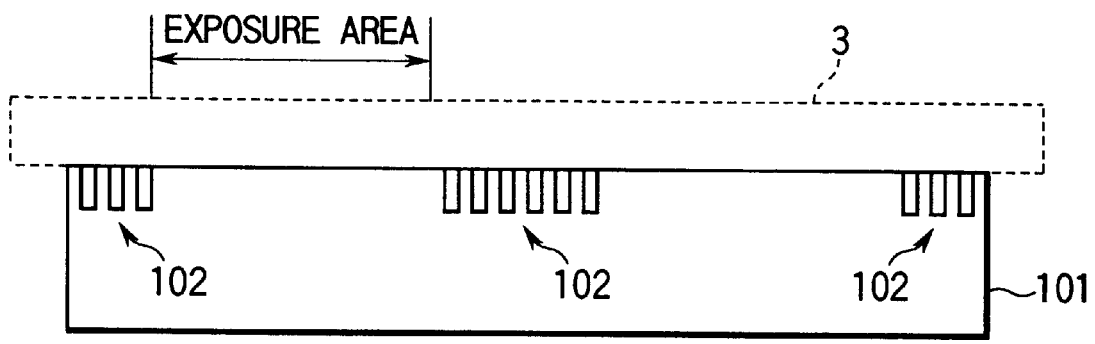
FIG. 22 is a view showing the configuration of grooves in a suction surface portion of a turntable.
Figure 23:
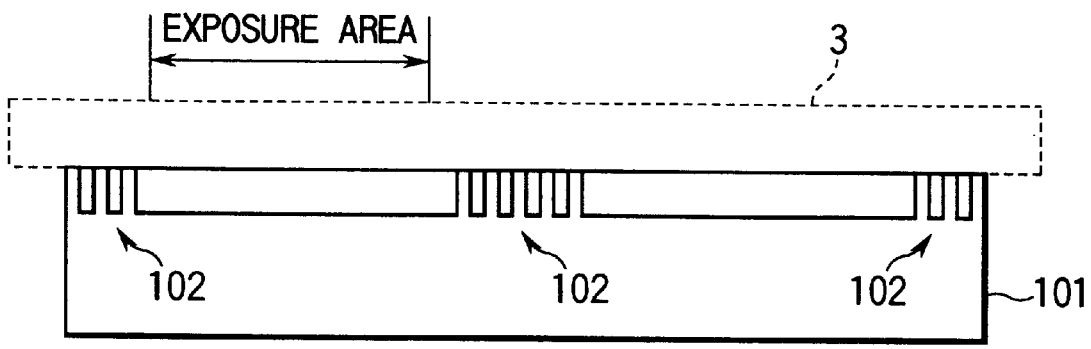
FIG. 23 is a view showing the configuration of a recessed area at a suction surface of a turntable.
Figure 24:
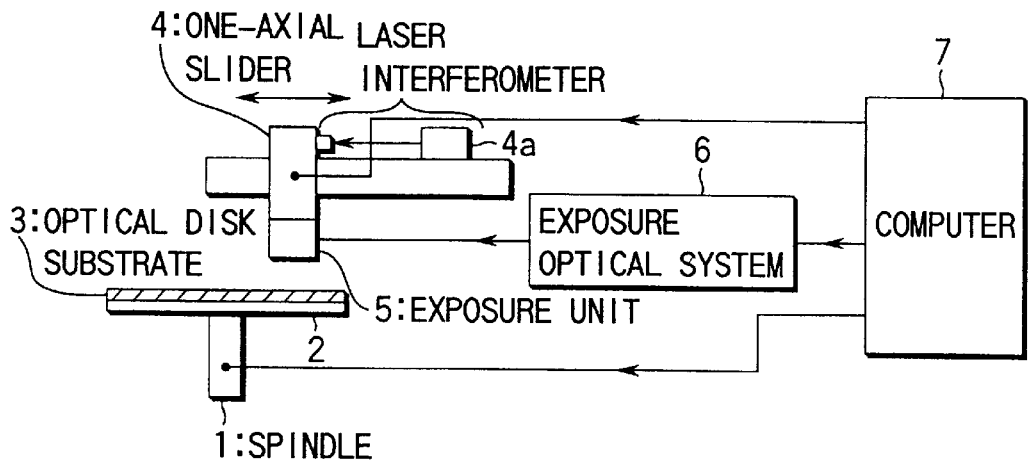
FIG. 24 is schematic view showing an arrangement of an optical disk substrate exposure apparatus of the prior art.

The turntable 101 is of such a type that suction surface recesses 102 are defined with projections as shown in FIG. 22 and grooves as shown in FIG. 23, both of which are formed at an area corresponding to a beam exposure area of the light disk substrate 3.

To the suction grooves of the turntable 101 are connected a two-stage electromagnetic air valve means, that is, a first stage electromagnetic air valve (hereinafter referred to as a first electromagnetic air valve) 103 via a corresponding pipe and a second stage electromagnetic air valve (hereinafter referred to as a second electromagnetic air valve) 104 via a corresponding pipe.

These first and second electromagnetic air valves 103 and 104, each, have three ports R. A and P, a series connection being made through their ports A and R in the valves. And a vacuum pump 105 is connected by a corresponding pipe to the port R of the later-stage second electromagnetic air valve 104.

A compressed air source 107 is connected by a corresponding pipe to the port P of the first electromagnetic air valve 103 via a first regulator 106 and by a corresponding pipe to the port P of the second electromagnetic air valve 104 via a second regulator 109 and electromagnetic valve-equipped ejector 108.

Therefore, the first electromagnetic air valve 103 is switched to the port A on the suction surface side of the turntable 101 selectively through the port P on the compressed air source 107 side or through the port R on the second electromagnetic air valve 104 side.

Further, the second electromagnetic air valve 104 is switched to the port A on the suction surface side of the first electromagnetic air valve 103 side selectively through the port P on the compressed air source 107 side or the port R on the vacuum pump 105 side.

A pressure control unit 110 operatively controls first and second electromagnetic air valves 103 and 104 and electromagnetic valve-equipped ejector 108 and has the function of setting the suction surface of the turntable 101 at the atmospheric pressure state and then at a positive pressure state between the suction surface of the turntable 101 and the optical disk substrate 3 and, thereafter, setting a state between the suction surface of the turntable 101 and the optical disk substrate 3 at a plurality of stages of vacuum levels, for example, to a low vacuum level of (the atmospheric pressure:100 mmHg) to (the atmospheric pressure:200mmHg) and then to a high vacuum level below (the atmospheric pressure—700 mmHg).

In conjunction with the operation of the apparatus thus arranged, explanation will be given below about the application, to the turntable, of the optical disk substrate exposure apparatus of the seventh embodiment.

In the manufacture of the optical disk, first a photoresist is coated as a photosensitive material on a glass substrate to provide an optical disk substrate 3.

This optical disk substrate 3 is sucked on the turntable 101 (the turntable 62 in the seventh embodiment) and fixed in place.

That is, the pressure control unit 110 allows the first electromagnetic air valve 103 to be opened to the second electromagnetic air valve 104 side (port A→R).

It allows the second regulator 109 to be closed and the supply of the compressed air from the compressed air source 107 to the electromagnetic valve-equipped ejector 108 to be cut off. At this time, the electromagnetic valve-equipped ejector 108 is opened to the atmospheric pressure side.

By doing so, the suction surface side of the turntable 101 is set to the atmospheric pressure.

The optical disk substrate 3 is placed on the suction surface of the turntable 101 set to the atmospheric pressure state.

In the second step, the optical disk substrate 3 is centered with respect to the turntable 101, that is, the center position of the optical disk substrate 3 is located with respect to that of the turntable 101 at which time the pressure control unit 110 allows the pressure control unit 110 to be opened to the pressure air source 107 side (valve port P). In this connection it is to be noted that the electromagnetic valve-equipped ejector 108 may be set to any state.

By the opening of the port P side of the first electromagnetic air valve, the compressed air from the compressed air source 107 is supplied to the suction surface of the turntable 101 through the first regulator 106 and first electromagnetic air valve 103. At this time, the compressed air to be supplied to the suction surface of the turntable 101 is supplied there in any state of any other associated devices.

Further, the supply pressure of the compressed air to the turntable 101 is adjusted by the first regulator 106 and set to a state somewhat about +1 kgf/cm$^2$, for instance, even at max. relative to the atmospheric pressure.

By doing so, a positive pressure level is set between the optical disk substrate 3 and the turntable 101.

The optical disk substrate 3 is centered by a centering mechanism with respect to the turntable 101 in a manner to be set to a positive pressure between the optical disk substrate 3 and the turntable 101.

Subsequently, in the third state, the pressure control unit 110 opens the first electromagnetic air valve 103 to the second electromagnetic air valve 104 side (port A→R) and the second electromagnetic air valve 104 to the electromagnetic valve-equipped ejector 108 side (port A→P).

The compressed air form the compressed air source 107 is supplied through the second regulator 109 to the electromagnetic valve-equipped ejector 108 may be set to any state.

By the opening of the port P side of the first electromagnetic air valve, the compressed air from the compressed air source 107 is supplied to the suction surface of the turntable 101 through the first regulator 106 and first electromagnetic air valve 103. At this time, the compressed air to be supplied to the suction surface of the turntable 101 is supplied there in any state of any other associated devices.

Further, the supply pressure of the compressed air to the turntable 101 is adjusted by the first regulator 106 and set to a state somewhat about +1 kgf/cm$^2$, for instance, even at max. relative to the atmospheric pressure.

By doing so, a positive pressure level is set between the optical disk substrate 3 and the turntable 101.

The optical disk substrate 3 is centered by a centering mechanism with respect to the turntable 101 in a manner to be set to a positive pressure between the optical disk substrate 3 and the turntable 101.

Subsequently, in the third state, the pressure control unit 110 opens the first electromagnetic air valve 103 to the second electromagnetic air valve 104 side (port A→R) and the second electromagnetic valve 104 to the electromagnetic valve-equipped ejector 108 side (port A→P).

The compressed air form the compressed air source 107 is supplied through the second regulator 109 to the electromagnetic valve-equipped ejector 108 to provide a vacuum state there.

At this time, the supply pressure to the electro-magnetic valve-equipped ejector 108 is adjusted by the second regulator 109 and, in order to prevent any displacement at a time of sucking operation following a centering operation, an achieved vacuum level at the electromagnetic valve-equipped ejector 108 is set to a lower vacuum level of, for example, (atmospheric pressure:100 mmHg) to (atmospheric pressure:200 mmHg).

By doing so, the optical disk substrate 3 is sucked at the above-mentioned lower vacuum level to the turntable 101, that is, lightly sucked.

Then the pressure control unit 110 allows the first electromagnetic air valve 103 to be opened to the second electromagnetic air valve 104 side (port A→R) and the second electromagnetic air valve 104 to be opened to the vacuum pump 105 side (port A→R). At third time, the electromagnetic valve-equipped ejector 108 may be put at any state.

By doing so, the suction surface of the turntable 101 is sucked through the first and second electro-magnetic air valves 103 and 104 by means of the vacuum pump 105 to set the optical disk substrate 3 in a sucked/fixed state.

At this time, an achieved vacuum level at the suction surface of the turntable 101 is set to a high vacuum level below, for example, (atmospheric pressure:700 mmHg).

When the optical disk substrate 3 is thus sucked/fixed to the turntable 101, the spindle motor 61 is rotated at a given rotation speed in the optical disk substrate exposure apparatus of the seventh embodiment and, in response thereto, the turntable 62 is rotated at a predetermined rotation speed and the optical disk substrate 3 thus sucked/fixed is also rotated at a predetermined rotation speed.

On the other hand, when a laser beam is output from the laser oscillator 64, it is reflected down on the first mirror 65 and reaches the second mirror 70 of the optical head 69 past the hollow section 67 of the rotating hollow motor 66.

And the laser beam is reflected on the second mirror 70 and then on the third mirror 71 downwardly and is directed as a just-focused condensing spot onto the optical disk substrate 3.

At this time, the hollow motor 66 is rotationally driven at a predetermined speed to allow an object lens 72 of the optical head 69 to be moved on a circular path corresponding to a drive path F as shown in FIG. 1.

By doing so, the laser beam is directed onto the optical disk substrate 3 whereby information to be recorded is formed as a recessed groove array to provide it as a pit signal.

The laser beam directed onto the optical disk substrate 3 is transmitted therethrough to the turntable 101. Since, however, the suction surface of the turntable 101 has the projections or groove alone as shown in FIG. 22 or FIG. 23, respectively, it is possible to reduce any uneven beam exposure resulting from any adverse influence caused by a reflected laser beam from the turntable 101.

In this way, if the beam exposure/recording is done on the optical disk substrate 3, information is transferred from the optical disk substrate 3 to provide an optical disk master. With this as a master, a metal stamper is formed as one necessary to the copying of an optical disk.

And copying is made with the use of the metal stamper to provide an optical disk as a finished product.

In the tenth embodiment thus shown, when the optical disk substrate 3 is placed on the turntable 101, the suction surface of the turntable 101 is set to the atmospheric state and then the state between the suction surface of the turntable and the optical disk substrate 3 is set to a positive state and then the optical disk substrate 3 is sucked/fixed at a two-stage vacuum level, that is at a lower and at a higher level between the suction surface of the turntable 101 and the optical disk substrate 3. Namely, in order to prevent any unbalance in the vacuum level, the suction surface of the turntable 101 is vacuum level shifted either at a stepped way or continuously from the atmospheric pressure to a high vacuum level, so that, even if the optical disk substrate 3 is previously centered to the turntable 101 and sucked/fixed there, it is possible to suck the optical disk substrate without being off-centered.

Further, since the projections or grooves are defined in the suction surface portion of the turntable 101 only at that area corresponding to the beam exposure area of the optical disk substrate 3, it is possible to reduce any uneven beam exposure resulting from an adverse effect caused by the reflection of the laser beam back from the turntable 101.

The tenth embodiment can be modified as follows.

For example, it may be possible to use one vacuum generation device, without restricting the use of two vacuum generation means of the vacuum pump 105 and electromagnetic valve-equipped ejector 108, control an achieving vacuum level through an electricity/air regulator for electric conversion of a supply pressure, and to continuously enhance an achieving vacuum level for substrate suction.

Further, it may also be possible to, without restricting the use of the two-stage electromagnetic air valves in a series array, connect more electro-magnetic air valves at a plurality of stages and, by doing so, adjust an achieving vacuum level.

Although the tenth embodiment has been explained as being applied to the turntable of the optical disk substrate exposure apparatus of the seventh embodiment, it can also be applied to the turntable of the optical disk substrate exposure method of the eighth embodiment.

As explained below, it is possible to, with the use of the optical disk substrate exposure method and apparatus of the present invention, achieve a beam exposure on the optical disk substrate at a much higher resolution than the limit of the available laser interferometer and encoder irrespective of any drive system and hence to contribute much to achieving a large capacity of a future optical disk.

Since the optical disk of the present invention ensures high-density recording at a high accuracy level, it is possible to provide a high-quality signal of less error and less jitters in the case where the information in an optical disk becomes high in density.

INDUSTRIAL APPLICABILITY

As set out above, the optical disk substrate exposure method and apparatus of the present invention provide a useful technique in the manufacture of not only a CD/DVD but also an optical disk master for future high-density recording and are suited to the manufacture of such apparatuses at low costs.

Further, the optical disk of the present invention can provide the compact low-cost recording media so as to satisfy a demand for an increasing amount of information involved with further development of the future multimedia culture.

What is claimed is:

1. An exposure method for exposing an optical disk substrate with an exposure beam and forming a spiral or concentric pit strings in the optical disk substrate, comprising the step of:
directing the exposure beam on the optical disk substrate such that a path of the exposure beam on the optical substrate has an arc path, wherein a center point of the arc path is within the optical substrate.

2. The exposure method according to claim 1, wherein directing the exposure beam on the optical disk substrate is performed for providing a path contacting with the pit string of the innermost side on the optical disk substrate.

3. The exposure method according to claim 1, wherein directing the exposure beam on the optical disk substrate is performed for providing a path contacting with the pit string of the outermost side on the optical disk substrate.

4. The exposure method according to claim 1, wherein directing the exposure beam on the optical disk substrate is performed for providing a path contacting with the pit string of the innermost side and pit string of the outermost side on the optical disk substrate.

5. The exposure method according to claim 1, wherein the arc path has a diameter corresponding to a sum of a radius of the pit string of the innermost side and that of the pit string of the outermost side on the optical disk substrate.

6. The exposure method according to claim 1, wherein the path of the exposure beam on the optical substrate is one of a circular arc path and a spiral path.

7. An exposure method for directing an exposure beam on an optical disk substrate and forming a spiral or concentric pit strings in the optical disk substrate, comprising the step of:
directing the exposure beam on the optical disk substrate is performed for providing a circular path whose center point is within the optical disk substrate.

8. An exposure method for exposing an optical disk substrate with an exposure beam and forming a spiral or concentric pit strings in the optical disk substrate, comprising the step of:
directing the exposure beam on the optical disk substrate to provide a path contacting with at least one position of the pit strings;
wherein directing the exposure beam on the optical disk substrate is performed for providing a path contacting with the pit string of the innermost side on the optical disk substrate.

9. The exposure method of claim 8, wherein directing the exposure beam on the optical disk substrate is performed for providing a straight path.

10. An exposure method for exposing an optical disk substrate with an exposure beam and forming a spiral or concentric pit strings in the optical disk substrate, comprising the step of:
directing the exposure beam on the optical disk substrate to provide a path contacting with at least one position of the pit strings;
wherein directing the exposure beam on the optical disk substrate is performed for providing a path contacting with the pit string of the outermost side on the optical disk substrate.

11. An exposure method for exposing an optical disk substrate with an exposure beam and forming a spiral or concentric pit strings in the optical disk substrate, comprising the step of:
directing the exposure beam on the optical disk substrate to provide a path contacting with at least one position of the pit strings;
wherein directing the exposure beam on the optical disk substrate is performed for providing a path contacting with the pit string of the innermost side and pit string of the outermost side on the optical disk substrate.

12. An exposure method for exposing an optical disk substrate with an exposure beam and forming a spiral or concentric pit strings in the optical disk substrate, comprising the step of:

directing the exposure beam on the optical disk substrate to provide a path contacting with at least one position of the pit strings;

wherein directing the exposure beam on the optical disk substrate is performed for providing a circular arc path having a diameter corresponding to a sum of a radius of the pit string of the innermost side and that of the pit string of the outermost side on the optical disk substrate.

13. An exposure apparatus comprising:

a light source for directing an exposure beam as an output on an optical disk substrate to provide a spiral or concentric pit strings;

a first rotator mechanism for rotating the optical disk substrate; and a second rotator mechanism rotationally moving the first rotation mechanism and having a rotation axis located about a line passing through the optical disk substrate.

14. An exposure apparatus for directing an exposure beam on an optical disk substrate and forming a spiral or concentric pit strings in the optical disk substrate, comprising:

a light source for exiting the exposure beam;

a table on which the optical disk substrate is placed;

a front-side mirror at least movable up and down on an axis orthogonal to the center of the optical disk substrate and receiving the exposure beam from the light source;

a frustoconical exposure beam mirror receiving the exposure beam from the front-side mirror and directing the exposure beam on the optical disk substrate; and exposure beam control means for rotating the front-side mirror and the optical disk substrate relatively to each other and for controlling an exposure beam path.

15. The exposure apparatus according to claim 14, wherein the front-end mirror includes a first mirror fixed with respect to the light source and has a curvature and a second mirror movable back and forth in an optical path direction to the light source and has a curvature, wherein a beam spot is created on the optical disk substrate by the first and second mirrors.

16. The exposure apparatus according to claim 15, wherein the curvature of either the first mirror or the second mirror or of both is controlled so that a lens function of the mirror surface is adjusted.

17. The exposure apparatus according to claim 15, wherein the first and second mirrors are provided at a back side of a cutout hinge opposite to that cutout side and the curvature of the mirror surface is controlled by controlling a voltage across piezoelectric elements at the cutout side of the cutout hinge.

18. An exposure apparatus for directing an exposure beam which is exited from an exposure beam optical head onto an optical disk substrate and forming a spiral or concentric pit strings on the optical disk substrate, comprising:

an XY stage on which the optical head is mounted; and a drive control section for driving the XY stage to allow the optical head to scan the optical disk substrate in an XY direction and an exposure beam path to be formed in a direction parallel to, or obliquely with respect to, the pit string.

19. An exposure apparatus for directing an exposure beam on an optical beam substrate and forming a spiral or concentric pit strings in an optical disk substrate, comprising:

exposure beam projector for projecting the exposure beam in a direction vertical to the optical disk substrate;

a front-side mirror for reflecting the exposure beam from the exposure beam projector;

an exposure mirror arranged relative to the front-side mirror at a distance corresponding to one half of a total sum of the outermost circumference recording radius and innermost circumference recording-radius on the optical disk substrate and allowing the exposure beam which is reflected on the front-side mirror to be directed in a direction vertical to the optical disk substrate surface; and moving means for relatively rotating the front-side mirror about an axis vertical to the optical disk substrate and for, in response thereto, relatively moving the exposure mirror, in a circular arc motion, around the front-side mirror while keeping that distance relative to the front-side mirror.

20. An exposure apparatus for directing an exposure beam which is exited from an exposure beam optical head to an optical disk substrate and forming a spiral or concentric pit strings in the optical disk substrate, comprising:

a rotator for rotating the optical disk substrate at a predetermined speed; and moving means for moving the optical head on a circular arc path inscribing the outermost circumference recording radius and circumscribing the innermost circumference recording radius of the pit string on the optical disk substrate.

* * * * *